(12) United States Patent
Bonhomme et al.

(10) Patent No.: US 10,074,400 B2
(45) Date of Patent: Sep. 11, 2018

(54) METHODS AND SYSTEMS FOR CREATING, COMBINING, AND SHARING TIME-CONSTRAINED VIDEOS

(71) Applicant: Snakt, Inc., Los Angeles, CA (US)

(72) Inventors: Gaëtan Bonhomme, Los Angeles, CA (US); Tristan Cameron Snell, Brooklyn, NY (US)

(73) Assignee: Snakt, Inc., Los Angeles, CA (US)

( * ) Notice: Subject to any disclaimer, the term of this patent is extended or adjusted under 35 U.S.C. 154(b) by 0 days.

(21) Appl. No.: 14/293,033

(22) Filed: Jun. 2, 2014

(65) Prior Publication Data
US 2014/0363141 A1  Dec. 11, 2014

Related U.S. Application Data

(60) Provisional application No. 61/831,168, filed on Jun. 5, 2013, provisional application No. 61/888,626, filed on Oct. 9, 2013.

(51) Int. Cl.
| | |
|---|---|
| *H04N 5/93* | (2006.01) |
| *G11B 27/00* | (2006.01) |
| *G11B 27/031* | (2006.01) |
| *H04N 21/2743* | (2011.01) |
| *H04N 21/63* | (2011.01) |
| *H04N 21/845* | (2011.01) |
| *H04N 21/8549* | (2011.01) |
| *H04N 21/4788* | (2011.01) |

(52) U.S. Cl.
CPC ....... *G11B 27/031* (2013.01); *H04N 21/2743* (2013.01); *H04N 21/4788* (2013.01); *H04N 21/632* (2013.01); *H04N 21/8456* (2013.01); *H04N 21/8549* (2013.01)

(58) Field of Classification Search
USPC ................................. 386/278–290
See application file for complete search history.

(56) References Cited

U.S. PATENT DOCUMENTS 6,608,994 B1 * 8/2003 Wegener ............... H04H 20/40
                                                        455/3.06
8,339,500 B2  12/2012 Hattori et al.
(Continued)

FOREIGN PATENT DOCUMENTS

EP  1377047 A2  1/2004
EP  1962521 A1  8/2008
(Continued)

OTHER PUBLICATIONS

Bissram, Veena, "Ptch Captures Your Life in Video the Way Instagram Captures it in Photos," Aug. 24, 2012; available at http://mashable.com/2012/08/24/ptch/ (as of Nov. 14, 2014).
(Continued)

*Primary Examiner* — Nigar Chowdhury
(74) *Attorney, Agent, or Firm* — Cynthia M. Gilbert; Blueshift IP, LLC

(57) ABSTRACT

A method includes displaying, by a video display device, to a user of a client device, a broadcast of an audiovisual data feed. The method includes receiving, by the client device, an identification of a portion of the audiovisual data feed. The method includes generating, by the client device, a time-constrained video from the identified portion of the audiovisual data feed.

12 Claims, 19 Drawing Sheets

(56) References Cited

U.S. PATENT DOCUMENTS

| | | |
|---|---|---|
| 8,346,605 B2 | 1/2013 | Krikorian et al. |
| 8,347,216 B2 | 1/2013 | Shin et al. |
| 9,282,068 B1 | 3/2016 | Pan et al. |
| 2002/0116716 A1* | 8/2002 | Sideman ........... G06F 17/30017 725/91 |
| 2003/0053798 A1* | 3/2003 | Roshanski ............... H04N 5/76 386/230 |
| 2003/0229900 A1* | 12/2003 | Reisman ........... G06F 17/30873 725/87 |
| 2004/0197088 A1* | 10/2004 | Ferman ................ G06F 3/0481 386/251 |
| 2006/0114363 A1* | 6/2006 | Kang ............... H04N 21/23412 348/838 |
| 2007/0156534 A1 | 7/2007 | Lerner et al. |
| 2007/0198532 A1 | 8/2007 | Krikorian |
| 2007/0262995 A1* | 11/2007 | Tran .................... G11B 27/034 345/473 |
| 2008/0085096 A1* | 4/2008 | Marshall ............. G11B 27/329 386/278 |
| 2008/0208692 A1 | 8/2008 | Garaventi et al. |
| 2009/0133094 A1* | 5/2009 | Malik .................... H04N 7/163 725/141 |
| 2010/0023958 A1 | 1/2010 | Bugenhagen |
| 2010/0260468 A1* | 10/2010 | Khatib ................ G06F 11/0757 386/278 |
| 2011/0026898 A1* | 2/2011 | Lussier ................ G11B 27/034 386/280 |
| 2011/0099195 A1 | 4/2011 | Patwardhan et al. |
| 2011/0119588 A1* | 5/2011 | Siracusano, Jr. ..... G06F 3/0481 715/723 |
| 2012/0159527 A1 | 6/2012 | Perez |
| 2012/0192239 A1 | 7/2012 | Harwell |
| 2012/0254716 A1 | 10/2012 | Choi |
| 2012/0254915 A1 | 10/2012 | Oztaskent |
| 2012/0270576 A1* | 10/2012 | Herrington ......... H04L 65/4076 455/466 |
| 2012/0311624 A1 | 12/2012 | Oskolkov et al. |
| 2013/0081089 A1* | 3/2013 | Kim ................... H04N 21/4122 725/61 |
| 2013/0259447 A1* | 10/2013 | Sathish .................... H04N 9/87 386/278 |
| 2013/0326406 A1 | 12/2013 | Reiley et al. |

FOREIGN PATENT DOCUMENTS

| | | |
|---|---|---|
| EP | 1969447 A2 | 9/2008 |
| EP | 2399362 A2 | 12/2011 |
| EP | 2496044 A1 | 9/2012 |
| KR | 101249279 B1 | 4/2013 |
| WO | WO2010096282 A2 | 8/2010 |
| WO | WO2013173479 A1 | 11/2013 |

OTHER PUBLICATIONS

Sippey, Michael,"Vine: A New Way to Share Video," Jan. 24, 2013, available at https://blog.twitter.com/2013/vine-a-new-way-to-share-video (as of Nov. 14, 2014).

"Remixing videos just got easier," Aug. 16, 2013, available at http://blogs.mixbit.com/remixing-videos-just-got-easier/, (as of Nov. 14, 2014).

"About Us," Oct. 30, 2008, available at http://5secondfilms.com/about (as of Nov. 14, 2014).

"What are Five Second Projects?", Sep. 21, 2014, available at http://greyscalegorilla.com/blog/five-second-projects/pinball/ (as of Nov. 14, 2014).

Alsever, Jennifer, "Video Testimonials Turn Customers into Spokespeople," Inc.com, Dec. 2011, available at http://www.inc.com/magazine/201112/video-testimonials-turn-customers-into-spokespeople-shoedazzle.html (as of Nov. 14, 2014).

Regine, "Le Cadavre Exquis—we make money not art," Sep. 3, 2011, available at http://we-make-money-not-art.com/archives/2011/09/le-cadavre-exquis.php (as of Nov. 14, 2014).

"About," available at http:/www.getstorybox.com/about (as of Nov. 14, 2014).

"Video Customer Product Reviews," available at http://www.productvid.com (as of Nov. 14, 2014).

International Search Report and Written Opinion for PCT/US2014/040453, dated Sep. 23, 2014, 12 pages.

Extended European Search Report dated Apr. 11, 2017 issued in European Patent Application No. 14807259.8, 11 pages.

Response to Extended European Search Report filed by Applicant dated Oct. 27, 2017 in European Patent Application No. 14807259.8, 11 pages.

\* cited by examiner

METHODS AND SYSTEMS FOR CREATING, COMBINING, AND SHARING TIME-CONSTRAINED VIDEOS

CROSS-REFERENCE TO RELATED APPLICATIONS

This application claims priority from U.S. Provisional Patent Application No. 61/831,168, filed on Jun. 5, 2013, entitled "Methods and Systems for Creating, Combining, and Sharing Time-Constrained Videos," and from U.S. Provisional Patent Application Ser. No. 61/888,626, filed on Oct. 9, 2013, entitled "Methods and Systems for Creating, Combining, and Sharing Time-Constrained Videos," each of which is hereby incorporated by reference.

BACKGROUND

The disclosure relates to creating, combining, and sharing video files derived from streaming or broadcast video content or recorded video content previously streamed or broadcast. More particularly, the methods and systems described herein relate to creating time-constrained video files, and using them to build, edit and arrange sequences of time-constrained video files, using either a single device capable of playing videos or multiple synced devices.

Video sharing is a popular activity, particularly on the Internet, where thousands or even millions of users can share a particularly interesting or humorous video. Creating videos is difficult however, requiring technical skills beyond the reach of the typical user to produce a polished product. There is also an asymmetry between the number of users interested in creating videos and the much larger number interested in viewing videos. Moreover, users interested in viewing videos have no easy way to be active participants in the editing and manipulation of videos, especially between people in remote locations communicating via the Internet. Consumers of a video over the Internet may approve, verbally comment on, and share the individual video, but they have no way to quickly and easily alter or add to the content of the video itself. There remains a need for a truly social, consumer-friendly way to create, modify, and share videos.

BRIEF SUMMARY

In one aspect, a method includes displaying, by a video display device, to a user of a client device, a broadcast of an audiovisual data feed. The method includes receiving, by the client device, an identification of a portion of the audiovisual data feed. The method includes generating, by the client device, a time-constrained video from the identified portion of the audiovisual data feed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein provide functionality for creating, combining, and sharing time-constrained videos, including those derived from streamed, broadcast, or recorded videos. Any streamed or broadcast video content, or recording of previously streamed or broadcast video content, may be referred to as a "feed." Additionally, "feed" may refer to any type of audio, visual, or audiovisual data, regardless of transmission type. Before describing these methods and systems in detail, however, a description is provided of a network in which such methods and systems may be implemented.

Figure 1A:
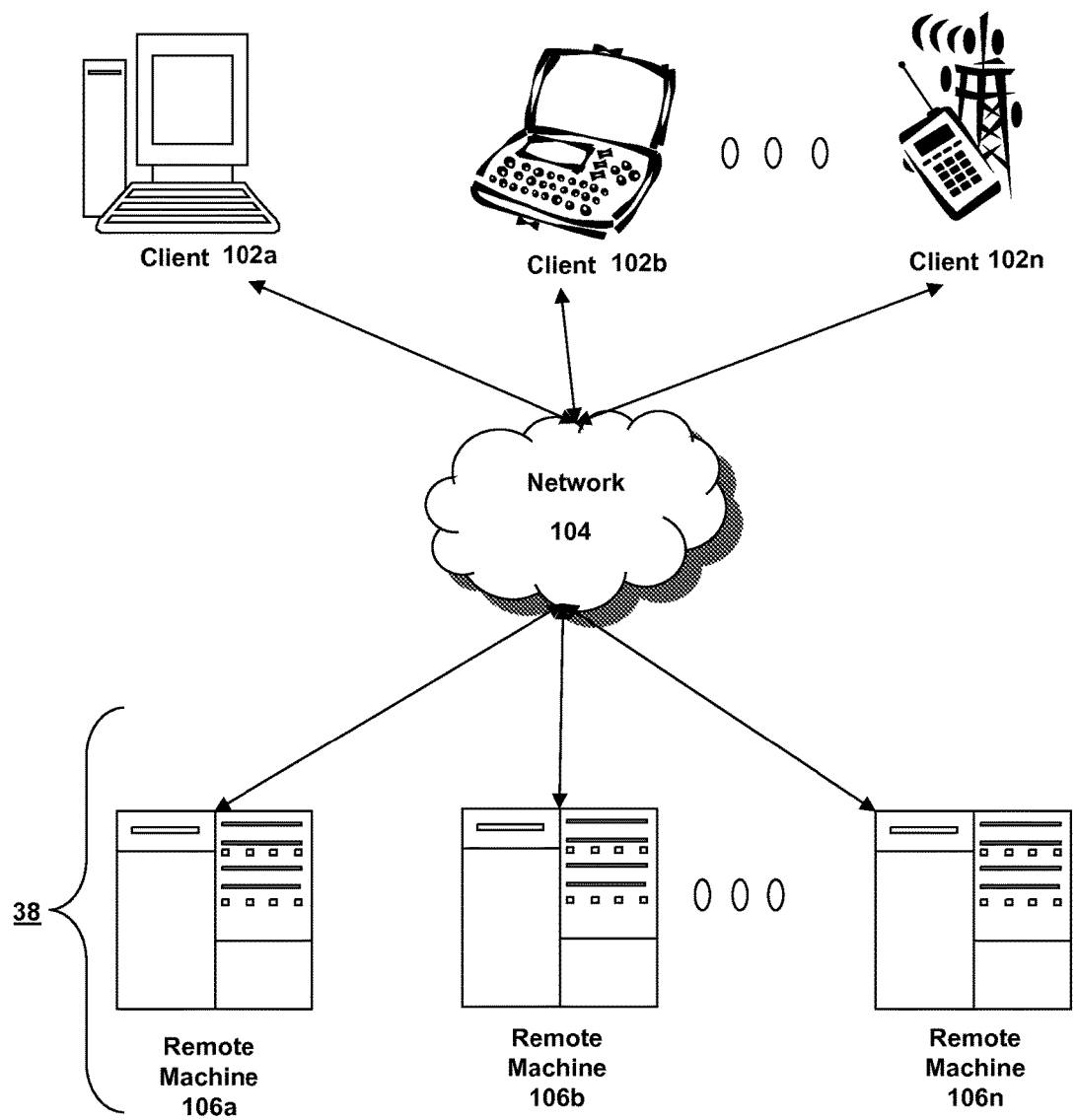
FIGS. 1A-1C are block diagrams depicting embodiments of computers useful in connection with the methods and systems described herein.

Referring now to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 includes an open-source web server such as the APACHE servers maintained by the Apache Software Foundation of Delaware. In other embodiments, the web server executes proprietary software such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
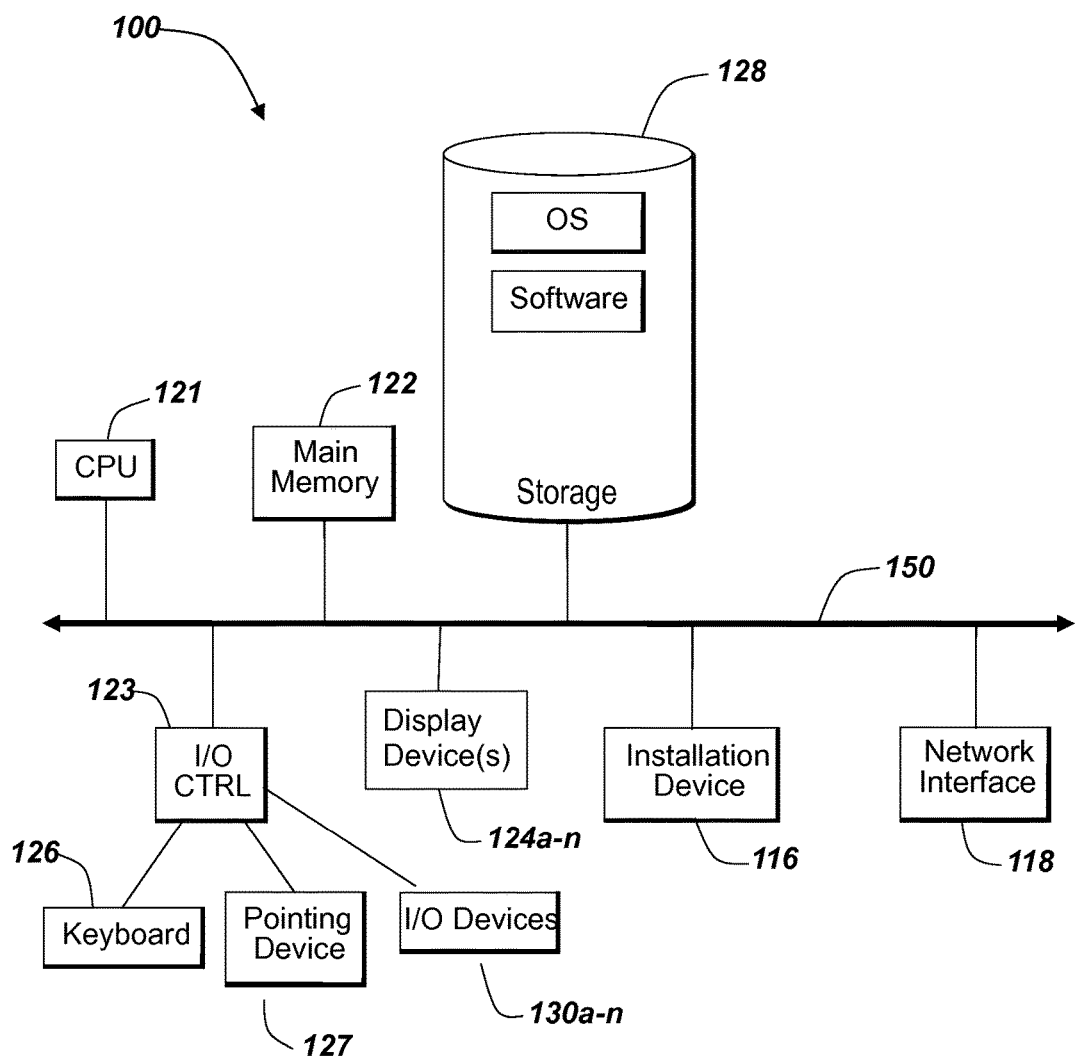
Figure 1C:
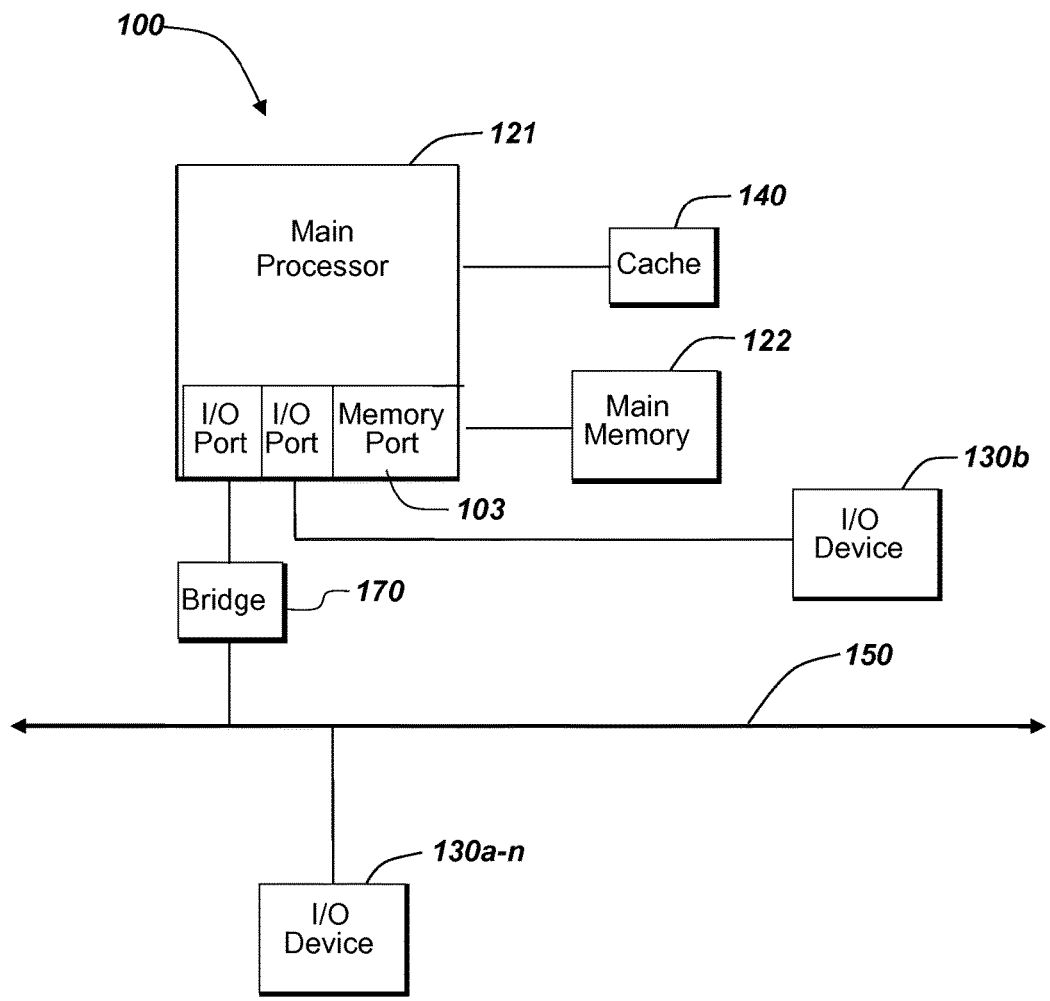

FIGS. 1B and 1C depict block diagrams of a computing device 100 useful for practicing an embodiment of the client 102 or a remote machine 106. As shown in FIGS. 1B and 1C, each computing device 100 includes a central processing unit 121 and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive, or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, SS7, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). In some embodiments, the computing device 100 provides communications functionality including services such as those in compliance with the Global System for Mobile Communications (GSM) standard or other short message services (SMS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, each of which may be of the same or different type and/or form. As such, any of the I/O devices 130a-130n and/or the I/O controller 123 may comprise any type and/or form of suitable hardware, software, or combination of hardware and software to support, enable, or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop, tablet, or notebook computer, server, portable computer, mobile telephone or other portable telecommunication device, media playing device, a gaming system, mobile computing device, or any other type and/or form of computing, telecommunications, or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill.; Kyocera of Kyoto, Japan; Samsung Electronics Co., Ltd. of Seoul, Korea; Nokia of Finland; Hewlett-Packard Development Company, L.P. and/or Palm, Inc., of Sunnyvale, Calif.; Sony Ericsson Mobile Communications AB of Lund, Sweden; or Research In Motion Limited of Waterloo, Ontario, Canada (doing business as "Blackberry"). In yet other embodiments, the computing device 100 is a smartphone, Pocket PC, Pocket PC Phone, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices manufactured by Apple Inc. of Cupertino, Calif. In another of these embodiments, the digital audio player may function as both a portable media player and as a mass storage device. In other embodiments, the computing device 100 is a digital audio player such as those manufactured by, for example and without limitation, Samsung Electronics America of Ridgefield Park, N.J., Motorola Inc. of Schaumburg, Ill., or Creative Technologies Ltd. of Singapore. In yet other embodiments, the computing device 100 is a portable media player or digital audio player supporting file formats including, but not limited to, MP3, WAV, M4A/AAC, GIF (including animated GIFs), WMA Protected AAC, AEFF, Audible audiobook, Apple Lossless audio file formats, and .mov, .m4v, and .mp4MPEG-4

(H.264/MPEG-4 AVC) video file formats. The computing device 100 may support multimedia playlist storage formats, such as M3U and M3U8.

In some embodiments, the computing device 100 includes a combination of devices, such as a mobile phone combined with a digital audio player or portable media player. In one of these embodiments, the computing device 100 is a device in the Motorola line of combination digital audio players and mobile phones. In another of these embodiments, the computing device 100 is a device in the iPhone smartphone line of devices manufactured by Apple Inc. of Cupertino, Calif. In still another of these embodiments, the computing device 100 is a device executing the Android open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the iPad line of devices manufactured by Apple Inc.; the PlayBook manufactured by Research In Motion; the Cruz line of devices manufactured by Velocity Micro, Inc. of Richmond, Va.; the Folio and Thrive line of devices manufactured by Toshiba America Information Systems, Inc. of Irvine, Calif.; the Galaxy line of devices manufactured by Samsung; the HP Slate line of devices manufactured by Hewlett-Packard; and the Streak line of devices manufactured by Dell, Inc. of Round Rock, Tex.

In some embodiments, the computing device 100 communicates with a navigation service (not shown). In one embodiment, a navigation service is a device, algorithm, service, or combination thereof that enables the computing device 100 to determine its geographical location. For example, the computing device 100 may have a transceiver (not shown) capable of communicating with one or more satellites in the Global Positioning System (GPS) network, which uses that communication with the transceiver to determine the location of the transceiver, and then communicates the determined location to the computing device 100 via the transceiver. In another embodiment, the navigation service functions by reference to local signal transmitters; for instance, the computing device 100 may determine its geographical location by reference to local wireless routers or cell towers.

In some embodiments, an infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, an administrator of a machine 106a on a first network may use a remotely located data center to store servers 106b-n (including, for example, application servers, file servers, databases, and backup servers), routers, switches, and telecommunications equipment. The data center may be owned and managed by the administrator of the machine 106a on the first network or a third-party service provider (including, for example, a cloud services and hosting infrastructure provider) may provide access to a separate data center.

In some embodiments, the methods and systems described herein provide functionality for creating and exchanging time-constrained videos. More particularly, the disclosed methods and systems aid in creating, combining, and sharing time-constrained videos including those derived from streaming or broadcast feeds. Using the disclosed systems, and following the described methods, users can assemble modular time-constrained videos into video sequences of various durations, and edit the sequences by swapping those time-constrained videos for others, rearranging their order, replacing or overlaying their sound files, and contributing captions to the time-constrained videos and the longer sequences containing them. Users can make their own time-constrained videos for general use or to include in particular sequences, and can make time-constrained videos registering their reaction to products and services for inclusion in reviews of those products and services. In some embodiments, the methods and systems disclosed herein provide for the creation of a library of popular culture tropes or memes stored in modular video form. Entities wishing to harness the power of dissemination represented by memes such as "viral videos" may use the methods disclosed herein to insert sponsored videos into the system, and allow the creativity of the system's users to propagate the desired message in multifarious forms.

Figure 2:
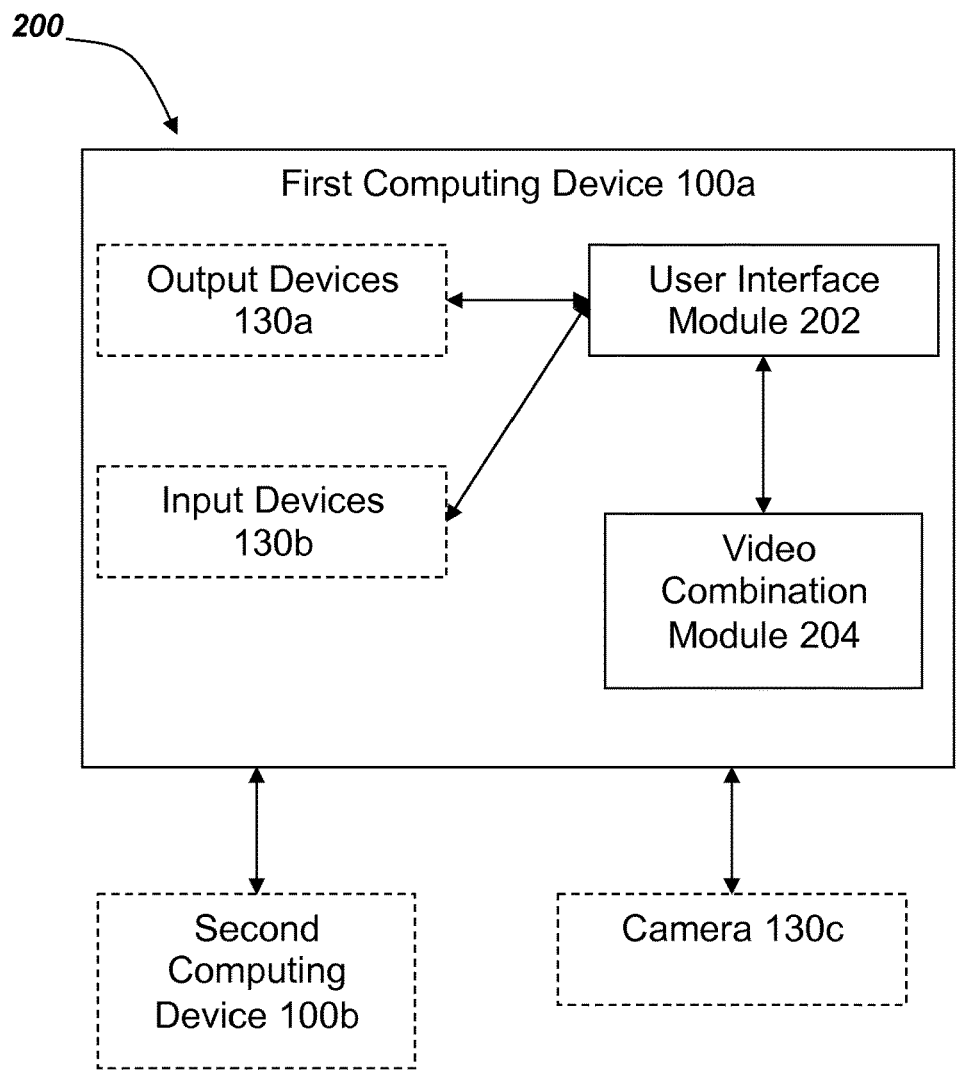
FIG. 2 is a block diagram depicting an embodiment of a system for combining and sharing time-constrained videos.

Referring now to FIG. 2, a block diagram depicts one embodiment of a system for combining and sharing time-constrained videos. In brief overview, the system 200 includes a first computing device 100a. The system 200 also includes a user interface module 202, and a video combination module 204.

The system 200 includes a first computing device 100a. In some embodiments, the first computing device 100a is a machine 106 as described above in reference to FIGS. 1A-1C. The computing device 100a may also be a set of such machines 106 working together as a single unit. The computing device 100a may be a first machine 106a that performs the methods set forth below, combined with or in communication with a second machine 106b specializing in data storage, such as a database or a directory of data storage files, to maintain a library of time-constrained videos and sequences. The first machine 106a may store, or be in communication with a second machine 106b storing, a library of feeds (e.g., audiovisual data that may be streamed or broadcast), from which time-constrained videos and sequences may be derived. In another embodiment, the second machine 106b may be an apparatus that executes functionality for broadcasting live, televised events, from which time-constrained videos and sequences may be derived. Where the computing device 100a acts as a server or broadcast apparatus 106, it may also communicate via a network 104 with a plurality of client devices 102 which transmit data to the server 106 pursuant to the disclosed method. Client devices 102 communicating with the server or broadcast apparatus 106 via the network 104 may also receive data from the server 106.

In one embodiment, a machine 106 (not shown) may be coupled to a data storage facility such as a database for storing large quantities of time-constrained videos and sequences. The machine 106, with any accessible memory facilities, may function as a central repository or video library from which the computing device 102 may retrieve either time-constrained videos and sequences, or longer video feeds from which time-constrained videos and sequences may be derived, pursuant to the methods described below. The machine 106 may also function as an apparatus for broadcasting live televised events from which time-constrained videos and sequences may be derived. The machine 106 and coupled memory facilities may serve as a backup system that periodically synchronizes with the computing device 102 to make a second copy of time-constrained videos and sequences stored in the local memory of the computing device 102.

In some embodiments, the computing device 100*a* is connected to input devices 130*b-c*. The input devices may include a digital camera 130*c*. In some embodiments, the digital camera 130*c* has circuitry or software integrated in it to function as a computing device 102. The computing device 100*a* may be a machine 102 that has an integrated digital camera 130*c*. In some embodiments, the digital camera 130*c* is operated as a stand-alone device separately from the first computing device 100*a*; the digital camera 130*c* may be connected to the first computing device 100*a* via an I/O control 123 solely during the transfer of previously captured video files. In other embodiments, the digital camera 130*c* only operates while connected to the first computing device 100*a*. In some embodiments, the digital camera 130*c* has a memory capable of storing video files. In other embodiments, the digital camera 130*c* has no memory of its own, and continuously relays video content to the first computing device 100*a*.

In some embodiments, the input devices include a microphone. The microphone may be integrated in the digital camera. The microphone may have circuitry or software integrated in it to function as a computing device 102. The microphone may be connected to the computing device 100*a* by a wired or wireless connection and operated from the computing device 100*a*. The computing device 100*a* may be a machine 102 with an integrated microphone. The microphone and digital camera may operate to record separately. The microphone and digital camera may operate synchronously, recording both optical and auditory data concerning the same event. The input devices 130*b-c* may also include data entry components designed to capture manual manipulations and translate them into data patterns. Where the computing device is a machine 102 with an integrated digital camera or microphone, the data entry components may include specialized buttons, levers, or other controls for manipulating the integrated digital camera 130*c* or microphone.

The system 200 functions to combine and share time-constrained videos. In one embodiment, a time-constrained video is a video of a fixed maximum length imposed by the system 200. That fixed maximum length is referred to herein as the time constraint, or simply as the constraint. A time-constrained video in some embodiments may be less than the time constraint. In some embodiments, a user of the system 200 imposes the fixed maximum length. In other embodiments, users of the system 200 voluntarily conform to a fixed maximum length although no technical restriction imposes the fixed length. In some embodiments, the time-constrained videos stored, combined, or shared by the system 200 are all subject to the same time constraint, and thus each is of substantially the same length as each of the other time-constrained videos. In other embodiments, the time-constrained videos stored, combined, or shared by the system 200 are all subject to the same time constraint, such that each is less than or equal to the length of the time constraint. In some embodiments, a time-constrained video is composed of a series of visual images. The visual images in the series may follow each other in sufficiently rapid succession to appear to form a continuous stream, simulating the visual experience by which human eyes perceive patterns of light in the world around them. In some embodiments, the time-constrained video is a digital image composed of pixels, wherein the pixels change over time. The changes to the pixels may cause the illusion in the view of seeing a series of still pictures. The still pictures the viewer perceives may transition from one to the next via various random or coordinated changes to the displayed pixels. In some embodiments, the pixels transform in such a way as to simulate the changes in light frequency, intensity, and polarization produced by objects reflecting and transmitting light, thus simulating the visual experience by which human eyes perceive patterns of light in the world around them. A time-constrained video may also display a single still image for a period of time set by the user, subject to the time constraint. A time-constrained video may also contain more than one still image, displayed in succession.

A time-constrained video may also include a sound file in some embodiments. A sound file in some embodiments is an audio recording. In some embodiments, a sound file is a digitally produced set of signals that are translated into audible sounds by a speaker or similar device. In some embodiments, the time-constrained video may contain several sound files, which play simultaneously, creating what is known as a "multi-track" effect.

In some embodiments, time-constrained videos also include captions, which may be provided as a text string displayed along with the images or image series that the time-constrained video portrays. In some embodiments, several captions display in sequence while a time-constrained video plays. Such a sequence of captions is referred to herein as a "caption sequence." A time-constrained video may consist of nothing more than a caption against a static background. A time-constrained video may consist of nothing more than a caption sequence against a static background.

In some embodiments, time-constrained videos may be combined by concatenation into video sequences. In one embodiment, a video sequence may contain a plurality of time-constrained videos. In another embodiment, a video sequence contains only one time-constrained video. Such video sequences may appear, when played, to be a single, continuous video; the computing device 100 may, however, maintain the video sequence in its memory as a set of separate time-constrained videos. The combining of time-constrained videos into a sequence may thus amount to the computing device 100 maintaining a data field reflecting an instruction to play the time-constrained videos in a specified order to portray a sequence. In embodiments in which the time-constrained videos include sound files, a sequence may also include a sequence of its component time-constrained videos' sound files. The sequence of sound files may also play as if it were a larger continuous sound file. In some embodiments, a sequence may also have a sound file associated with it that is as long as the entire sequence. The sequence may also have a sound file as long as any fraction of the sequence. The captions or caption sequences associated with the time-constrained videos in a sequence may also be joined together in some embodiments to form a longer caption sequence. A sequence may also have a caption sequence of its own. A sequence of time-constrained videos that display still images may resemble a slide show.

In some embodiments, a sequence also contains an instruction to the device playing the sequence to repeat the entire sequence a certain number of times. A sequence may also contain an instruction to the device playing the sequence to repeat the entire sequence indefinitely. In some embodiments, a sequence also contains an instruction to the device playing the sequence to repeat a portion of the sequence a certain number of times. A sequence may also contain an instruction to the device playing the sequence to repeat a portion of the sequence indefinitely. In some embodiments, a time-constrained video also contains an instruction to the device playing the time-constrained video to repeat the time-constrained video a certain number of times. A time-constrained video may also contain an instruction to the device playing the time-constrained video to repeat the time-constrained video indefinitely.

In one embodiment, the user interface module 202 is provided as part of a software application operating on the computing device 100a. Where the computing device 100a is a server 106, the user interface module 202 may communicate with the user via a remote client device 102, through client-side programming.

The video combination module is provided in some embodiments as part of a software application operating on the computing device 100a. Where the computing device is a server 106, the video combination module may receive time-constrained videos from a counterpart program on a remote client device 102.

Although for ease of discussion the user interface module 202 and the video combination module 204 are described as separate modules, it should be understood that this does not restrict the architecture to a particular implementation. For instance, these modules may be encompassed by a single circuit or software function.

In some embodiments, the system 200 also includes additional computing devices 100b, which relay instructions to the computing device 100a. In some embodiments, a second computing device 100b communicates with the first computing device 100a over a network 104 (not shown). In some embodiments, the second computing device 100b executes its own instances of the user interface module 202 and video combination module 204. In some embodiments, the second computing device also maintains sequences in its memory. In some embodiments, the second computing device maintains time-constrained videos in its memory. In some embodiments, the system 100 includes both the first and second computing devices as well as a third computing device (not shown). In some embodiments, the third computing device also maintains sequences in its memory. In some embodiments, the third computing device maintains time-constrained videos in its memory. In some embodiments, the third computing device also executes its own instances of the user interface module 202 and video combination module 204.

Figure 3A:
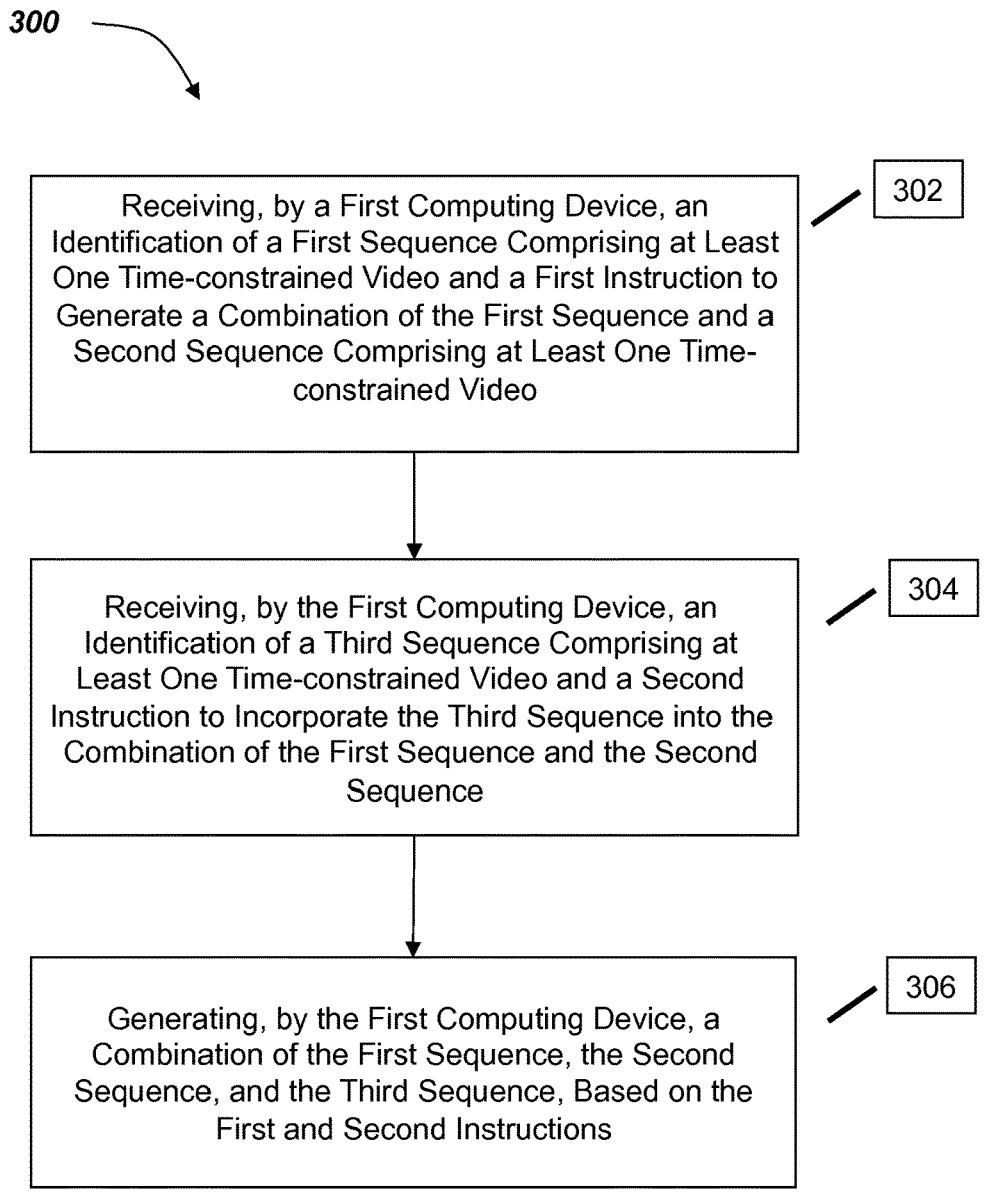
FIG. 3A is a flow diagram depicting one embodiment of a method for combining and sharing time-constrained videos.

Referring now to FIG. 3A, a flow diagram depicts one embodiment of a method 300 for combining and sharing time-constrained videos. In brief overview, the method 300 includes receiving, by a first computing device, an identification of a first sequence comprising at least one time-constrained video and a first instruction to generate a combination of the first sequence and a second sequence comprising at least one time-constrained video (302). The method 300 also includes receiving, by the first computing device, an identification of a third sequence comprising at least one time-constrained video and a second instruction to incorporate the third sequence into the combination of the first sequence and the second sequence (304). The method 300 further includes generating, by the first computing device, a combination of the first sequence, the second sequence, and the third sequence, based on the first and second instructions (306).

Referring now to FIG. 3A in greater detail, and in connection with FIG. 2, the method 300 includes receiving, by a first computing device, an identification of a first sequence comprising at least one time-constrained video and a first instruction to generate a combination of the first sequence and a second sequence comprising at least one time-constrained video (302). In some embodiments, the instructions are received via input devices 130b connected to the computing device 100a. In other embodiments, the first computing device receives at least one of the first instruction and the second instruction from a second computing device. For instance, the computing device 100a may be a server 106 and may receive at least one of the first instruction and the second instruction from a client device 102 that receives the instructions.

The user may select the first sequence from a set of available sequences displayed to the user via output devices 130a. For instance, the user interface module 202 may display a set of files representing sequences that are available. The user interface module 202 may display a set of files representing time-constrained videos that are available. The user interface module 202 may display a set of files representing sound files that are available. The user interface module 202 may display a set of files representing caption sequences that are available. The user interface module 202 may display available files as thumbnails. The user interface module 202 may display a number representing the number of time-constrained videos in a sequence on a thumbnail representing that sequence. In other embodiments, the user interface module 202 allows the user to scroll through representations of sequences and select a representation of a sequence, causing the user interface module 202 to display the constituent time-constrained videos in the sequence. For instance, the user may flick or swipe the video to the right in order to send it to an editor screen at which point it "opens up" into its constituent clips, which can be reordered, removed from the sequence, or combined with additional time-constrained videos or sequences thereof to form a new sequence, as set forth in more detail below. As a result, the user may select further sequences to combine with the earlier-selected sequences as set forth in more detail below.

In some embodiments, the user interface module 202 may display a subset of available files that is filtered according to selection criteria. The subset may be the result set of a query as set forth in more detail below. The subset may be created by reference to videos associated with past activity by the user. For instance, the user interface module 202 may collect the subset by reference to videos previously viewed by the user. The user interface module 202 may collect the subset by reference to videos contained in collections associated with a user account linked to the user as set forth in more detail below. The user interface module 202 may collect the subset by reference to videos reviewed by the user, as set forth in more detail below.

The user interface module 202 may collect the subset by reference to videos the user previously enjoyed. The user interface module 202 may determine the degree of user enjoyment of a video by analyzing behavioral indicia of user enjoyment. For instance, the user interface module 202 may use the proportion of a sequence of time-constrained videos viewed by the user to determine the user's enjoyment of the sequence; if the user viewed the entire sequence, the user interface module 202 may determine that the user enjoyed the sequence. If the user viewed only a portion of the sequence, the user interface module 202 may determine that the user did not enjoy the sequence. In other embodiments, the user interface module 202 may use the proportion of a sequence of time-constrained videos viewed by the user to determine the user's enjoyment of the time-constrained videos within the sequence. For instance, if the user watched the entire sequence, the user interface module 202 may determine that the user enjoyed each time-constrained video in the sequence. If the user watched a subset of the entire sequence, the user interface module 202 may determine that the user liked some parts of the subset and disliked other parts of the subset. As an example, if the user watched time-constrained videos 1 through 4 of a 5-video sequence, but did not watch the fifth, the user interface module 202 may determine that the user enjoyed the first three videos but did not like the fourth video; The user interface module 202 may determine a lower degree of enjoyment for the first three videos than if the user had watched the entire sequence to the end.

In other embodiments, the user interface module 202 determines that a user liked a sequence because the user saved that sequence to a "favorites" folder including sequences the user has decided to watch again. The user interface module 202 may determine that the user liked a time-constrained video because the user saved the time-constrained video to a favorites folder. In additional embodiments, the user interface module 202 determines that a user liked a sequence because the user has included the sequence in a content channel associated with the user, as set forth in more detail below. The user interface module 202 may determine that a user liked a time-constrained video because the user has included the video in a content channel associated with the user. The user interface module 202 may determine that the user liked a video sequence if the user shares that video sequence with another user. The user interface module 202 may determine that the user liked a time-constrained video if the user shares that video with another user. The user interface module 202 may determine that the user liked a sequence if the user exports the sequence to another platform. The user interface module 202 may determine that the user liked a time-constrained video if the user exports the video to another platform. In other embodiments, the user interface module 202 determines that a user liked a sequence because the user modifies the sequence, as described below in reference to FIG. 3E.

In some embodiments, the user interface module 202 determines the degree to which a user likes or dislikes a video based upon choices the user makes when modifying, combining, or generating sequences containing the video as described herein in reference to FIGS. 3A-3E. The user interface module 202 may determine that a user likes a video to a high degree where the user reuses the video, without modification, in a modified or new sequence. The user interface 202 may determine that the user likes the video to a still higher degree where the video is used in multiple new or modified sequences. The user interface module 202 may determine that the user likes the video to a lesser degree where the user modifies the video; for instance, where the user modifies the sound associated with the video, the user interface module 202 may determine that the user likes the video to a lesser extent than if the user had not modified the sound. In some embodiments, the user interface module 202 determines that the user did not like an element of the video that the user eliminated; for instance, where the user has replaced the music accompanying the video with different music, the user interface module 202 may determine that the user liked the unchanged elements of the video and that the user did not like the music that accompanied the video. In other embodiments, the user interface module 202 determines that the user dislikes a video where the user eliminates the video from a sequence containing the video, and uses the remainder of the sequence to create a new or modified sequence. The user interface module 202 may alternatively determine that the user liked the video under circumstances indicating that the user replaced it with a different version emulating the video; as a non-limiting example, where the user utilizes a homemade time-constrained video to insert the user into the video sequence in the place of a performer within the sequence, the user interface module 202 may determine that the user liked the original video. The user interface module 202 may determine the degree to which a user likes or dislikes a video or sequence using any combination of the above techniques; for instance, if the user modifies a time-constrained video and subsequently shares or reuses the modified video many times, the user interface module 202 may determine that the user liked the video to a great extent because of its frequent use by the user.

In some embodiments, the subset contains time-constrained videos sharing content characteristics with videos associated with past activity by the user; for instance, if past activity of the user is associated with a particular genre, the subset may include other time-constrained videos fitting that genre. If past activity of the user is associated with a particular performer within a time-constrained video, the subset may include other time-constrained videos involving that performer. If past activity of the user is associated with a particular creator of a time-constrained video, the subset may include other time-constrained videos involving that creator. In still other embodiments, the subset shares one or more metadata characteristics with videos associated with past activity of the user. For instance, if the user has viewed some videos produced by a second user, the subset may contain more videos produced by that second user. If the user has viewed some videos published by a second user, the subset may contain more videos published by the second user. The subset may include videos that are aggregated with videos the user has viewed in the past, for instance by means of a "hashtag" aggregator, as set forth more fully below. The subset may include videos having geographic location metadata matching a geographic location associated with the user; for instance, the subset may contain videos created near the user's current location, as determined by a navigation facility communicating with the computing device 100*a*. The subset may contain videos created near the user's home or work address. The subset may contain videos associated with positive experiences by the user, including videos the user interface module 202 has determined the user likes. The subset may also be created by excluding videos associated with negative experiences by the user; for instance, videos sharing characteristics with a video the user gave a negative review may be excluded from the subset. Likewise, videos sharing characteristics with a video the user interface module 202 determined the user did not like may be excluded from the subset. In some embodiments, the subset is presented to the user as a set of recommendations for the user to view.

The user interface module 202 may record a user's selection of a displayed file. The user may select the second sequence from a set of sequences displayed to the user via output devices 130*a* as well. The user may also select the first video sequence by selecting a smaller portion of an already extant video sequence. For example, where the user wishes to replace a time-constrained video in a previously existing sequence with a different time-constrained video, the user may select a first sequence containing all the videos prior to the one to be replaced in the pre-existing sequence, selecting a second sequence containing the replacement video, selecting a third sequence including all the videos after the one to be replaced in the pre-existing sequence, and making a new sequence based on the three selections.

In some embodiments, the first sequence is a single time-constrained video. In other embodiments, the first sequence is composed of more than one time-constrained video. In some embodiments, the second sequence is a single time-constrained video. In other embodiments, the second sequence is composed of more than one time-constrained video. In some embodiments, receiving the first instruction further includes receiving an instruction to concatenate the first sequence and the second sequence.

The method includes receiving, by the first computing device, an identification of a third sequence comprising at least one time-constrained video and a second instruction to incorporate the third sequence into the combination of the first sequence and the second sequence (304). The user may select the third sequence from a set of sequences available displayed to the user via output devices 130*a*. In some embodiments, the third sequence is a single time-constrained video. In other embodiments, the third sequence includes more than one time-constrained video. The third sequence may also be a section of a larger sequence. In some embodiments, receiving the second instruction further includes receiving an instruction to insert the third sequence between the first sequence and the second sequence. In some embodiments, receiving the second instruction further includes receiving an instruction to append the third sequence to a concatenation of the first sequence and the second sequence.

The method 300 includes generating, by the first computing device, a combination of the first sequence, the second sequence, and the third sequence, based on the first and second instructions (306). The first, second, and third sequences may be stored in memory accessible to the first computing device. In some embodiments, the method 300 includes receiving, by the first computing device, at least one video sequence from a second computing device. In some embodiments, the video combination module 204 combines the first sequence, second sequence, and third sequence into a new sequence, so that the combination plays from beginning to end as a single video. In some embodiments, the video combination module 204 provides a user interface with which a user may edit a time-constrained video. Edits may include, without limitation, adding or removing captions, audio sequences, or portions of the time-constrained video. Edits may also include replacing the time-constrained video with a different version of the time-constrained video, for example, one that has been downloaded, edited using third-party systems, and then uploaded back into the system 200.

In some embodiments, the method 300 includes (i) receiving, by the first computing device, an instruction to add a sound file to at least one of the first sequence, the second sequence, and the third sequence, and (ii) adding the sound file to the at least one of the first sequence, the second sequence and the third sequence. Some embodiments replace the sound file of the sequence, or time-constrained video within the sequence, named by the instruction. In other embodiments, the sound file added to the sequence is added in addition to any preexisting sound files, so that the sounds produced by the new file are layered over those produced by the preexisting files. Users may therefore replace the statement that a character in a scripted video sequence makes. The sound file to add to the sequence in question may be stored and available locally in some embodiments. In some embodiments, the first computing device receives the sound file from a second computing device. The user can also allow the video sequence's natively recorded audio to play normally.

Some embodiments of the method 300 include receiving, by the first computing device, an instruction to add a caption sequence to at least one of the first sequence, the second sequence, and the third sequence, and adding the caption sequence to the at least one of the first sequence, the second sequence and the third sequence. The user may enter the caption sequence on the computing device 100, using input devices 130*b*. The caption sequence may be stored in memory accessible to the computing device 100. In some embodiments, the first computing device receives the caption sequence from a second computing device. In some embodiments, the first computing device also receives an instruction specifying the location on the screen of the caption sequence. In some embodiments, the first computing device receives an instruction specifying the font size of the caption sequence. In some embodiments, the first computing device receives an instruction specifying the font style of the caption sequence. In some embodiments, the first computing device receives an instruction specifying the text color of the caption sequence. In some embodiments, the first computing device receives an instruction specifying the text outline color of the caption sequence. In some embodiments, the first computing device receives an instruction specifying the background color of the caption sequence. The caption sequence may be removed from one sequence and added to another.

In some embodiments, the first computing device also receives an instruction specifying the location on the screen of an individual caption. In some embodiments, the first computing device receives an instruction specifying the font size of an individual caption. In some embodiments, the first computing device receives an instruction specifying the font style of an individual caption. In some embodiments, the first computing device receives an instruction specifying the text color of an individual caption. In some embodiments, the first computing device receives an instruction specifying the text outline color of an individual caption. In some embodiments, the first computing device receives an instruction specifying the background color of an individual caption. A caption may be removed from one sequence and added to another.

Some embodiments of the method 300 also include transmitting, by the first computing device, at least one sequence to a second computing device. In some embodiments, the transmitted sequence is the one produced by the video combination component 204 as described above. In other embodiments, the transmitted sequence is the first sequence, the second sequence, or the third sequence. In some embodiments, method 300 includes transmitting, by the first computing device, the generated combination to a second computing device.

In some embodiments, the method 300 maintains metadata concerning a sequence. The metadata in some embodiments is a label, such as a hash tag, that allows the sequence to be aggregated with other sequences. The metadata may be displayed by the user interface module 202 in such a way as to permit the user to view sequences aggregated using shared labels. The metadata may have an identifying feature that enables a computing device or person to identify a category to which the metadata belongs; for example, the metadata may be identified by a special character including, without limitation, the special character "#" commonly used for thematic aggregation, or the special character "@" that commonly links content to a particular user identifier. In some embodiments, the metadata includes multiple labels according to which the sequence may be aggregated with more than one distinct group of sequences depending on the label selected. In some embodiments, the metadata includes labels associated with time-constrained videos contained in the sequence, which permit aggregation with other time-constrained videos. In some embodiments, the metadata includes words describing the sequence. In some embodiments, the metadata includes words describing a time-constrained video included in the sequence. The metadata may include descriptions of the content of the time-constrained video; for instance, the metadata may describe a genre of the time-constrained video. The metadata may describe a performer appearing in the time-constrained video. The metadata may also contain information concerning the circumstances of creation of the time-constrained video. The metadata may describe a creator of the time-constrained video. The metadata may describe a time and date at which the time-constrained video was created. The metadata may describe a geographical location at which the time-constrained video was created.

Some embodiments of the method 300 involve maintaining, by the first computing device, user accounts in memory accessible to the first computing device. The user accounts may include identification information corresponding to a user of the system 200. The user accounts may include contact information corresponding to the user. For instance, the contact information included in a user account may be an email address at which the user can be reached. User accounts in some embodiments include billing information corresponding to the users associated with the user accounts. In some embodiments, a single person may have multiple user accounts. In some embodiments, a person who has multiple user accounts may use more than one user account simultaneously while interfacing with the first computing device. In one of these embodiments, the person with multiple user accounts views content from each user account from a single user interface. In other embodiments, the person with multiple user accounts selects an account from which to create or share time-constrained videos and can alternate between accounts via a second user interface element (not shown). In one embodiment, when viewing user accounts, users may view one or more time-constrained videos associated with the user account. In another embodiment, when viewing user accounts, users may view one or more sequences associated with the user account. In still another embodiment, when viewing user accounts, users may view one or more featured time-constrained videos associated with the user account. In yet another embodiment, when viewing user accounts, users may view a status indicator for one or more other users associated with the user account (e.g., users may view an indication of 'friends' or other associated users that are available online).

In some embodiments, users can store a collection of files under their user accounts. The files a user stores in a user account may include time-constrained videos. The files a user stores in a user account may include sound files. The files a user stores in a user account may include files containing caption sequences. In some embodiments, a user may store sequences in his or her user account. In some embodiments, adding a new sequence to the files stored in a user account automatically adds all of the component files of the sequence, including all of the time-constrained videos, all of the sound files, and all of the files containing caption sequences to the files stored in the user account.

In some embodiments, certain user accounts are designated premium accounts. In other embodiments, a user is billed for the privilege of having a premium account. In further embodiments, the user interface module 202 displays advertising content to users of non-premium accounts. The advertising content may include banner advertisements displaying on the side of a web page by means of which the user accesses the system 200. The advertising content may include new browser windows that display images and text advertising products. The advertising content may include videos that contain images associated with a sponsored product. The videos may be sequences as set forth above in reference to FIG. 2. The videos may be played to the user by the user interface module 202 prior to the display of a video requested by the user. In some embodiments, the user interface module 202 appends sponsored content to the end of a video requested by the user. The appended content may be information regarding a product. The appended content may contain a hyperlink permitting the user to navigate to a location chosen by the sponsor. The appended content may include other event-handlers the user can use to navigate to a location chosen by the sponsor. The appended content may be another time-constrained video. The appended content may be a sequence. In some embodiments, the user interface module 202 appends a sponsored time-constrained video to the beginning of the user's chosen sequence and appends other sponsored content to the end of the chosen sequence.

In some embodiments, advertising content is associated with a particular time-constrained video. For example, if a particular time-constrained video is played, the user interface module 202 may cause an associated sponsored video to play before the time-constrained video. If a user places the particular time-constrained video associated with a sponsored video in a sequence, the sponsored video may play before the sequence plays. In some embodiments, some time-constrained videos are associated with a content channel. The content channel may be a portion of a user account created to associate certain time-constrained videos with each other. The content channel may be a portion of a user account created to associate certain time-constrained videos with a particular user. A content channel may be associated with certain advertising content. For example, the content channel belonging to a particular corporation may be associated with advertising content regarding that corporation. A content channel associated with a user may be associated with advertising content. The advertising content may be associated with a user's user account. The advertising content may be associated with content channels linked to the user's user account. The advertising content associated with a particular content channel, including a streaming or broadcast feed, may also be associated with time-constrained videos that are associated with that channel. For instance, the advertising content may be included in one or more particular time-constrained videos associated with a particular content channel. The advertising content may be one or more particular time-constrained videos associated with a particular content channel. In some embodiments, the user may choose not to view the advertising content associated with a particular content channel; for example, the user may have the option to "skip" the advertising content. As another example, the advertising content may be identified as such within the content channel, so that the user must select the advertising content to view it. If a user chooses time-constrained videos from more than one content channel, each with its own associated advertising content, then in some embodiments the user interface module chooses the advertising content to display based on an auction system, whereby the sponsors of the advertising content have placed various maximum bids and the system will display the advertising content with the highest bid. In some embodiments, sponsors can submit different bids for different time slots. In some embodiments, sponsors can submit different bids for different geographic locations. In some embodiments, sponsors can submit different bids for different demographic groups.

In some embodiments, a user can purchase one or more time-constrained videos via the user interface module 202. The user may purchase a single time-constrained video. The user may purchase a sequence of time-constrained videos. The user may purchase a collection of time-constrained videos. In some embodiments, the user interface module 202 permits the user to download the one or more purchased time-constrained videos to a computing device 100 used by the user. In other embodiments, the user interface module 202 permits the user to link the purchased videos to a content channel associated with the user; for instance, the user interface module 202 may enable users viewing a page associated with the user to view the one or more purchased videos. In some embodiments, the user interface module 202 enables the user to play the one or more purchased videos without advertising content. In some embodiments, the user interface module 202 permits any additional user allowed to access the content channel associated with the user to play the one or more purchased videos from the user's content channel without advertising content. In other embodiments, the user interface module 202 prevents the user from transferring purchased videos to other users. In additional embodiments, the user interface module 202 permits other users to view the purchased videos, but does not permit the other users to re-use the videos to modify or create video sequences as disclosed in reference to FIGS. 3A-3E. In still other embodiments, the user interface module 202 associates purchased videos with advertising content again when transferred to another user; for instance, a second user may be permitted to copy a purchased video to the second user's content channel, but the copied video will play in that content channel with advertising content. The user may purchase the one or more time-constrained videos using points as described in further detail below. The user may purchase the one or more time-constrained videos by any means used for purchasing products or services by electronic means, including credit and debit card transactions, electronic check payments, and payments via third-party payment services.

In some embodiments, the method 300 includes receiving, by the first computing device, an instruction to limit access to at least one specified sequence to specified user accounts, and denying, by the first computing device, access to the at least one specified sequence to all user accounts except the specified user accounts. In some embodiments, the first computing device 100a receives instructions to include some user accounts in a user group. In some embodiments the user interface module 202 accepts user inputs limiting access to at least one sequence to a user group. In some embodiments the inclusion of an additional user in the user group causes the system 200 to permit the additional user access to sequences accessible only to members of the user group. In some embodiments, a user can designate a group of other users who are able to view files associated with the user's user account. In some embodiments, the users so designated are able to choose whether to accept the designation. Users who do not accept the designation may be excluded from the group. In some embodiments a user may designate some files associated with the user account as viewable only by the user. In some embodiments, the user may designate some files associated with the user account as viewable by all users. In some embodiments, the user may designate some files associated with the user account as viewable and alterable. In some embodiments, the user may designate a sequence as viewable by other users, but not alterable. In some embodiments, the user may designate a time-constrained video as viewable but not alterable by other users. In some embodiments, no new user may be permitted to view the files subject to limited access unless all users currently authorized to view the files agree to permit access for the new user.

In some embodiments, the first computing device 100a receives an instruction to modify a level of access associated with at least one time-constrained video. In one of these embodiments, the level of access specifies how users may interact with the time-constrained video. For example, the level of access may indicate that a user can view and alter the time-constrained video. Alternatively, the level of access may indicate that a user can view the video but not alter the time-constrained video. In another of these embodiments, the level of access specifies which users may view the time-constrained video. For example, the first computing device 100a may receive an instruction to make a time-constrained video publicly available (e.g., to all users of the system). As another example, the first computing device 100a may receive an instruction to make a time-constrained video available to a subset of all users (e.g., to a particular user or users identified by a user or administrator authorized to modify access rights associated with the time-constrained video). As yet another example, the first computing device 100a may receive an instruction to revise a previously identified level of access. For instance, a user may have specified in a first instruction that a time-constrained video should be made publicly available and then specify in a second instruction that the time-constrained video should be made available only to a subset of all users, or to no others at all, or that it should be available to the public or to a subset of users but not alterable. In such an embodiment, the first computing device 100a may (i) identify sequences containing the time-constrained video and available to a broader set of users than allowed in the received instruction and (ii) modify the sequences so as not to include the time-constrained video. In another such embodiment, the first computing device 100a may (i) identify sequences containing the time-constrained video and available to a broader set of users than allowed in the received instruction and (ii) modify the sequences so as to revert the time-constrained video back to the state it was in when posted by the original creator, removing all alterations.

In some embodiments, the method 300 includes awarding, by the first computing device, points to a user account for a metric concerning combinations assembled by the user corresponding to the user account. In some embodiments, the metric is the number of combinations assembled by the user. In other embodiments, the metric is the number of views received by a combination. Other embodiments involve receiving, by the first computing device, rules governing the content of combinations, and deducting, by the first computing device, points for violations of the rules. In some embodiments, the metric is based upon the result of a game in which a group of users sequentially alters a single combination. For instance, the system may administer a game in which a group of users take turns adding to a combination, in which each user can only see the addition made by a previous user. In some embodiments, each user may add a time-constrained video to the combination. In some embodiments, each user may add a sound file to the combination. In some embodiments, each user may add a caption to the combination. Other embodiments involve permitting, by the first computing device, redemption by the user corresponding to the user account of points for prizes. In some embodiments, points are assigned by a sponsor for use, in combinations, of time-constrained videos provided by the sponsor, and the sponsor provides the prizes for which the points the sponsor assigns may be redeemed. In some embodiments, the points may be used to purchase one or more time-constrained videos as set forth above in reference to FIG. 3A.

In some embodiments, the user interface module 202 displays a set of sequences to the user. In some embodiments, the set of sequences displayed may be taken from a library of sequences stored on the computing device 100*a* or on a remote server or broadcast apparatus 106 (not shown) connected to the computing device 100*a* by a network. The user interface module 202 may select a subset of the total sequences available to display to the user. In other embodiments, the user interface module 202 may select a subset of time-constrained videos derived from longer streaming or broadcast feeds. In some embodiments, the user interface module 202 selects sequences to display according to the number of times the sequences have been viewed. In some embodiments, the user interface module 202 selects sequences to display according to the degree of positive ratings the sequences have received. In some embodiments, the user interface module 202 selects sequences based upon the prior viewing history of the user. In some embodiments, the user interface module 202 selects sequences based upon criteria entered in an instruction by the user via the user interface module 202.

In some embodiments, the user interface module receives a user selection of a displayed sequence. In some embodiments, the selection of a sequence by a user causes the sequence to play on the display of the device by means of which the user is interfacing with the computing device 100*a*. In some embodiments, when the sequence plays, metadata concerning the sequence also displays. The metadata may include the number of previous views of the sequence. The metadata may include information about the user that assembled the sequence. The metadata may include information about the time that the sequence was created. In some embodiments, the displayed metadata may include a label, such as a hash tag, that permits the sequence to be aggregated with other sequences possessing the same label. In other embodiments, the metadata that displays includes reviews of and comments about the sequence by other viewers. The reviews may include quantitative fields. The quantitative fields included in the reviews may be aggregated.

In some embodiments, a user who has viewed a sequence may add to its metadata. In some embodiments, the user leaves a review of or comment about the sequence. The review or comment may comprise text describing the user's reaction. The review may comprise a number entered in a numerical field to indicate the user's degree of satisfaction with the sequence. The review may contain a link to a different sequence that represents the user's reaction to the sequence.

Figure 3B:
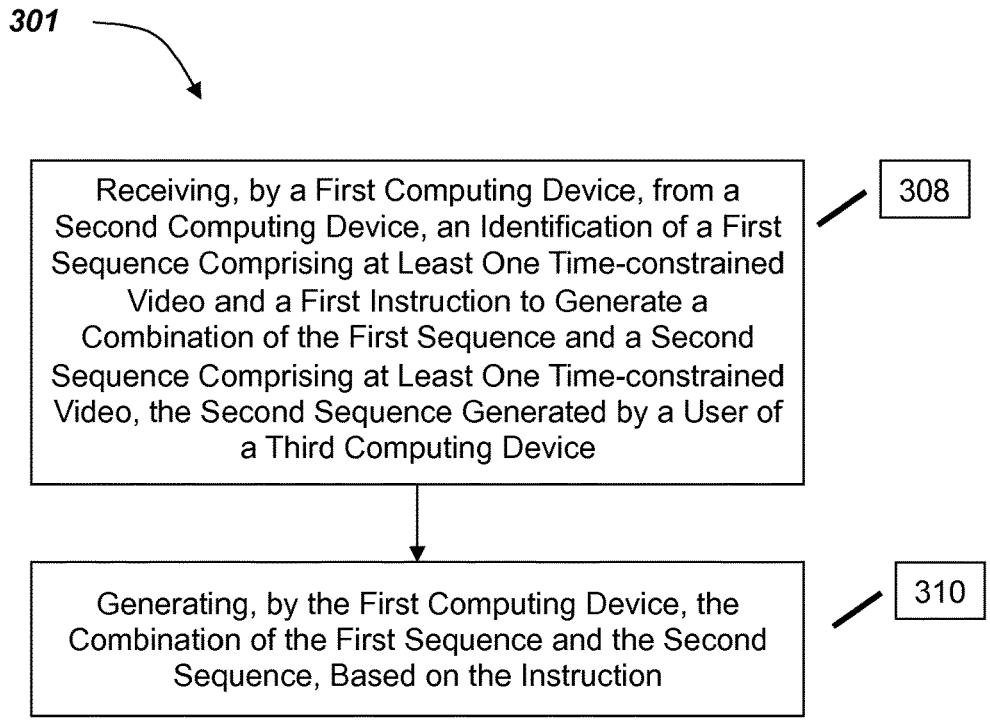
FIG. 3B is a flow diagram depicting one embodiment of a method for sharing time-constrained videos.

Referring now to FIG. 3B, a flow diagram depicts one embodiment of another method 301 for sharing time-constrained videos. In brief overview, the method 301 includes receiving, by a first computing device, from a second computing device, an identification of a first sequence comprising at least one time-constrained video and a first instruction to generate a combination of the first sequence and a second sequence comprising at least one time-constrained video, the second sequence generated by a user of a third computing device (308). The method 301 also includes generating, by the first computing device, the combination of the first sequence and the second sequence, based on the instruction (310).

Referring now to FIG. 3B in greater detail, and in connection with FIG. 2, the method 301 includes receiving, by a first computing device, from a second computing device, an identification of a first sequence comprising at least one time-constrained video and a first instruction to generate a combination of the first sequence and a second sequence comprising at least one time-constrained video, the second sequence generated by a user of a third computing device (308). In some embodiments, the user interface module 202 performs this identification and first instruction reception as described above in connection FIG. 3A, (302).

The method 301 also includes generating, by the first computing device, the combination of the first sequence and the second sequence, based on the instruction (310). In some embodiments, the video combination module 204 performs this combination generation as described above in connection with FIG. 3A, (306).

Figure 3C:
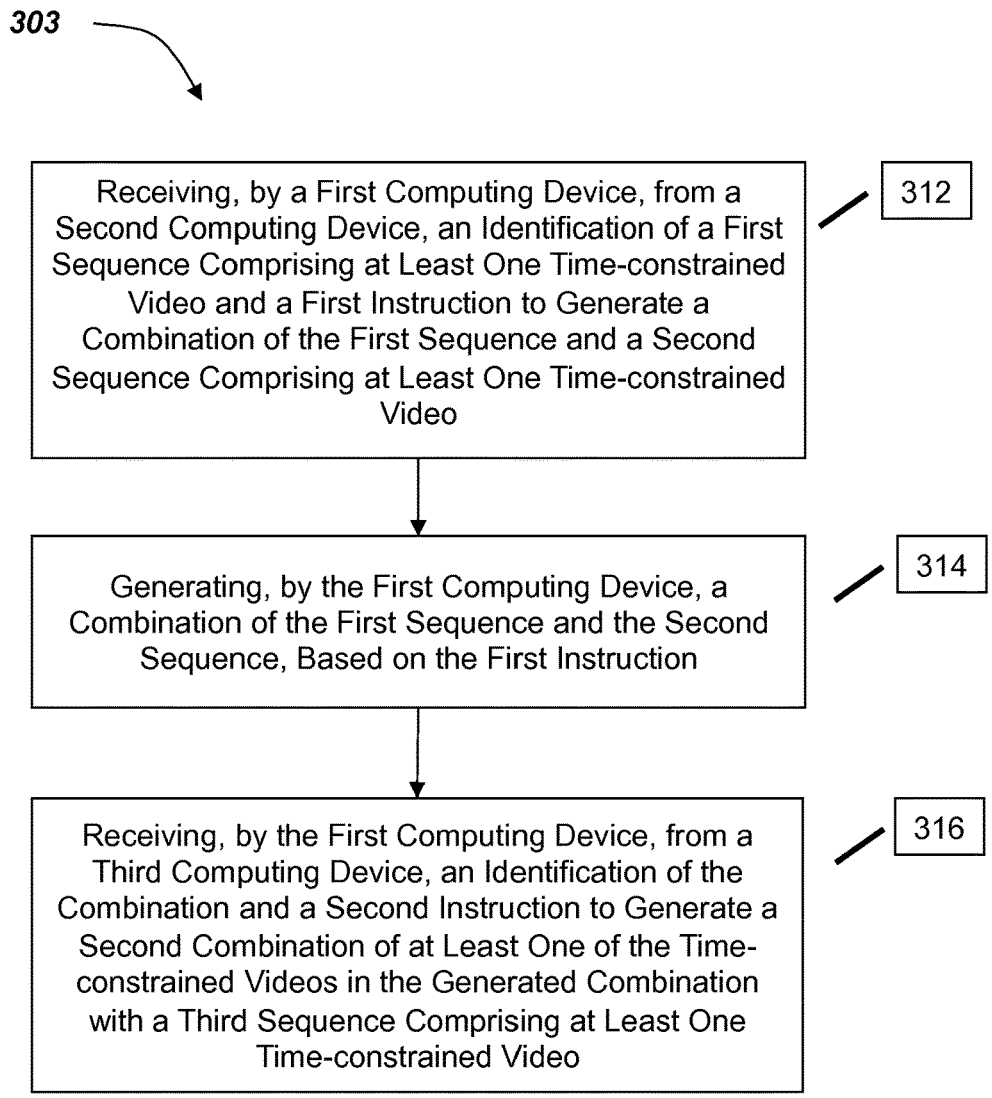
FIG. 3C is a flow diagram depicting one embodiment of a method for sharing time-constrained videos.

Referring now to FIG. 3C, a flow diagram depicts one embodiment of another method 303 for sharing time-constrained videos. In brief overview, the method 303 includes receiving, by a first computing device, from a second computing device, an identification of a first sequence comprising at least one time-constrained video and a first instruction to generate a combination of the first sequence and a second sequence comprising at least one time-constrained video (312). The method 303 also includes generating, by the first computing device, a combination of the first sequence and the second sequence, based on the first instruction (314). The method 303 further includes receiving, by the first computing device, from a third computing device, an identification of the combination and a second instruction to generate a second combination of at least one of the time-constrained videos in the combination with a third sequence comprising at least one time-constrained video (316).

Referring now to FIG. 3C in greater detail, and in connection with FIG. 2, the method 303 includes receiving, by a first computing device, from a second computing device, an identification of a first sequence comprising at least one time-constrained video and a first instruction to generate a combination of the first sequence and a second sequence comprising at least one time-constrained video (312). In some embodiments, the user interface module 202 performs this identification and first instruction reception as described above in connection with FIG. 3A, (302).

The method 303 also includes generating, by the first computing device, a first combination of the first sequence and the second sequence, based on the first instruction (314). In some embodiments, the video combination module 204 performs this combination generation as described above in connection with FIG. 3A, (306).

The method 303 further includes receiving, by the first computing device, from a third computing device, an identification of the combination and a second instruction to generate a second combination of at least one of the time-constrained videos in the combination with a third sequence comprising at least one time-constrained video (316). In some embodiments, the user interface module 202 depicts the first combination to the user to permit the user to select the elements of the first combination the user will combine with the third sequence. In one of these embodiments, the user interface module 202 provides a user interface with which the user may browse existing combinations of time-constrained videos; upon selection of one of the existing combinations of time-constrained videos by the user, the user interface module 202 displays the first combination to the user. In another of these embodiments, the user interface module 202 displays the first combination to the user along with a user interface element for sharing one or more of the time-constrained videos in the first combination. In another of these embodiments, the user interface module 202 displays the first combination to the user along with a user interface element for modifying one or more of the time-constrained videos in the first combination. In another of these embodiments, the user interface module 202 displays the first combination to the user along with a user interface element for reusing one or more of the time-constrained videos in the first combination. In some embodiments, the user interface module 202 depicts each time-constrained video within the first combination as a distinct unit to aid in the selection of the elements. In other embodiments, the user interface module 202 permits the user to select the desired elements using a pointing device 127 as described above in reference to FIG. 1B. In some embodiments, the user interface module 202 accepts user selections of one or more time-constrained videos that are parts of the first combination. The user interface module 202 may permit the user to manipulate user-selected videos in a sequence together as a unit. The user interface module 202 may pass such a user-selected video sequence to the video combination module 204 as a unit. The user interface module 202 may pass instructions concerning such a user-selected video sequence as a unit to the video combination module 204. In some embodiments, the user interface module 202 performs the identification and receives instructions as described above in connection with FIG. 3A, (304).

In some embodiments, the user interface module 202 accepts user-input queries to search for sequences to select. In some embodiments, the user interface module 202 matches the queries against keywords. In some embodiments, the user interface module 202 matches the queries against hash tags. In some embodiments, the user interface module 202 matches the queries against metadata. The user interface module 202 may display videos associated with matching data to the user. The user interface module 202 may display video sequences associated with matching data to the user. The user interface module 202 may permit the user to select displayed matching videos for use as the first sequence in this method. The user interface module 202 may permit the user to select displayed matching videos for use as the second sequence in this method. The user interface module 202 may permit the user to select displayed matching sequences as the first sequence in this method. The user interface module 202 may permit the user to select displayed matching sequences as the second sequence in this method.

In some embodiments, the user interface module 202 may accept user selections of a sound file that is included in the first combination. The user interface module 202 may accept user selection of a plurality of sound files that are included in the first combination. The user interface module 202 in some embodiments accepts instructions to combine a sound file with the third sequence. In some embodiments, the user interface module 202 accepts instructions to combine a plurality of sound files with the third sequence. In some embodiments, the user interface module 202 performs the above identification and first instruction reception regarding sound files as described above in connection FIG. 3A, (304). In some embodiments, the user interface module 202 accepts instructions to add a licensed music file to the third sequence. In some embodiments, the user interface module 202 accepts instructions to add a public domain music file to the third sequence. In some embodiments, the user interface module 202 accepts instructions to add a user-created sound file to the third sequence.

In some embodiments, the user interface module 202 may accept user selections of a caption sequence that is included in the first combination. The user interface module 202 may accept user selection of a plurality of caption sequences that are included in the first combination. The user interface module 202 in some embodiments accepts instructions to combine a caption sequence with the third sequence. In some embodiments, the user interface module 202 accepts instructions to combine a plurality of caption sequences with the third sequence. In some embodiments, the user interface module 202 performs the above identification and first instruction reception regarding caption sequences as described above in connection with FIG. 3A, (304).

Some embodiments of the method further include generating, by the first computing device, a second combination based on the second instruction. In some embodiments, the video combination module 204 performs this combination generation as described above in connection with FIG. 3A, (306). In some embodiments, the video combination module 204 generates the second combination as described above in connection with FIG. 3A, (306), iteratively combining the third sequence with one of a plurality of selected time-constrained videos.

In some embodiments, the video combination module 204 combines a sound file selected by the user with the third sequence, based on the second instruction. In some embodiments, the video combination module 204 combines the sound file with the third sequence as described above with regard to the combination of sound files with video sequences in connection with FIG. 3A (306).

In some embodiments, the video combination module 204 combines a caption sequence selected by the user with the third sequence, based on the second instruction. In some embodiments, the video combination module 204 performs this combination as described above with regard to the combination of caption sequences with video sequences in connection with FIG. 3A (306).

Figure 3D:
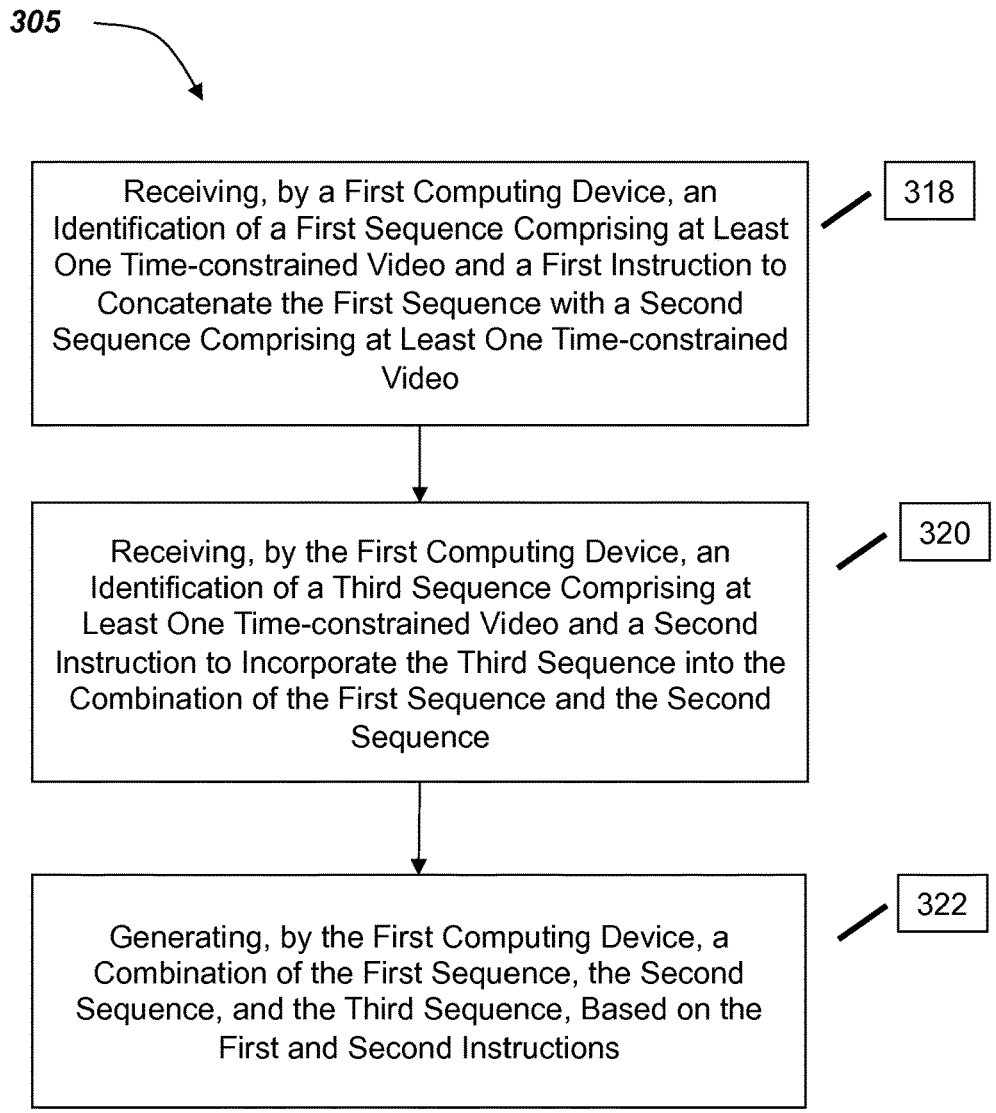
FIG. 3D is a flow diagram depicting one embodiment of a method for combining time-constrained videos.

Referring now to FIG. 3D, a flow diagram depicts one embodiment of another method 305 for combining time-constrained videos. In brief overview, the method 305 includes receiving, by a first computing device, an identification of a first sequence comprising at least one time-constrained video and a first instruction to concatenate the first sequence with a second sequence comprising at least one time-constrained video (318). The method 305 also includes receiving, by the first computing device, an identification of a third sequence comprising at least one time-constrained video and a second instruction to incorporate the third sequence into the combination of the first sequence and the second sequence (320). The method 305 further includes generating, by the first computing device, a combination of the first sequence, the second sequence, and the third sequence, based on the first and second instructions (322).

Referring now to FIG. 3D in greater detail, and in connection with FIG. 2, the method 305 includes receiving, by a first computing device, an identification of a first sequence comprising at least one time-constrained video and a first instruction to concatenate the first sequence with a second sequence comprising at least one time-constrained video (318). In some embodiments, the user interface module 202 receives the identification and the first instruction as described above in connection with FIG. 3A (302).

The method 305 also includes receiving, by the first computing device, an identification of a third sequence comprising at least one time-constrained video and a second instruction to incorporate the third sequence into the combination of the first sequence and the second sequence (320).

In some embodiments, the user interface module 202 incorporates the third sequence into the combination as described above in connection with FIG. 3A (304).

The method 305 further includes generating, by the first computing device, a combination of the first sequence, the second sequence, and the third sequence, based on the first and second instructions (322). In some embodiments, the video combination module 204 generates the combination as described above in connection with FIG. 3A (306).

Figure 3E:
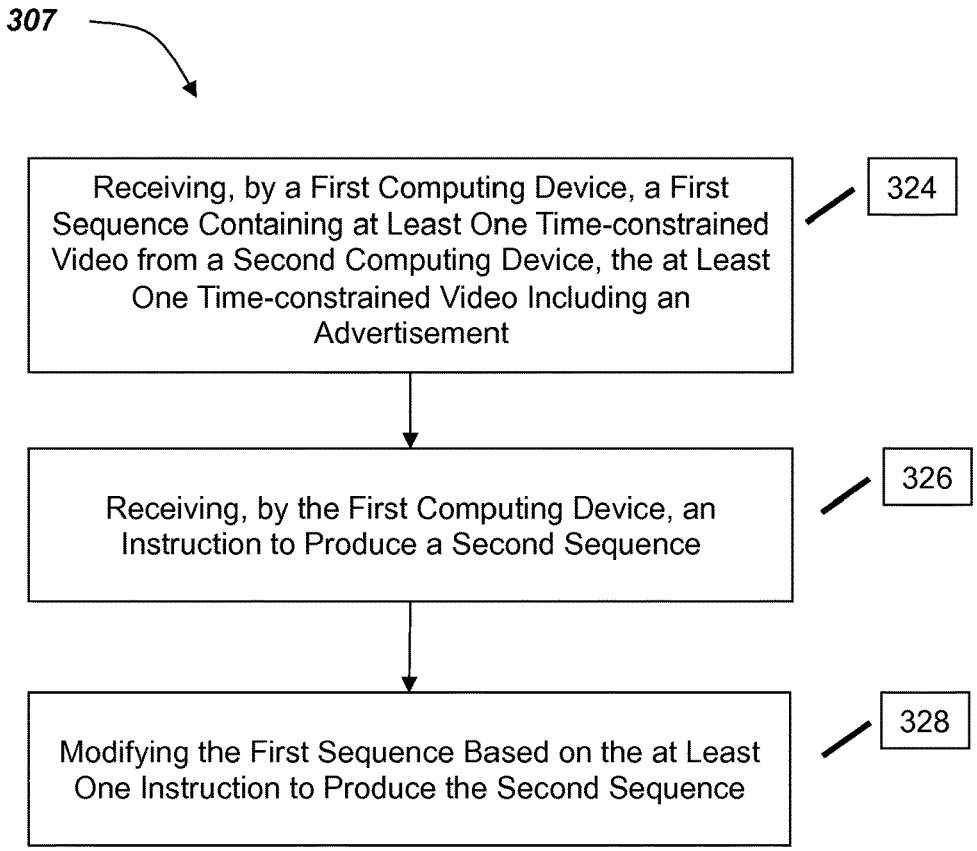
FIG. 3E is a flow diagram depicting one embodiment of a method for modifying sequences of time-constrained videos.

Referring now to FIG. 3E, a flow diagram depicts one embodiment of another method 307 for modifying sequences of time-constrained videos. In brief overview, the method 307 includes receiving, by a first computing device, a first sequence containing at least one time-constrained video from a second computing device, the at least one time-constrained video including an advertisement (324). The method 307 also includes receiving, by the first computing device, an instruction to produce a second sequence (326). The method 307 further includes modifying the first sequence based on the at least one instruction to produce the second sequence (328).

Referring now to FIG. 3E in greater detail, and in connection with FIG. 2, the method 307 includes receiving, by a first computing device, a first sequence containing at least one time-constrained video from a second computing device, the at least one time-constrained video including an advertisement (324). In some embodiments, the user interface module 202 or video combination module 204 receives the first sequence in the manner described above for receiving video sequences from other computing devices in connection with FIG. 3A (306).

In some embodiments, the first sequence contains content advertising a product. In some embodiments, the first sequence contains content advertising a service. In some embodiments, the first sequence contains content advertising an institution. The first sequence may be a complete advertisement video similar to a television commercial. The first sequence may contain advertisement content only in one of its time-constrained videos. The first sequence may contain advertisement content in a plurality of its time-constrained videos, which is less than the total number of time-constrained videos. The first sequence may contain advertising content in a sound file. The first sequence may contain advertising content in a plurality of sound files. In some embodiments, the first sequence contains advertising content in a caption sequence. In further embodiments, the first sequence contains advertising content in a plurality of caption sequences.

In some embodiments, a sponsor produces the first sequence. A sponsor pays the proprietor of the system 200 performing this method in some embodiments. In some embodiments, the sponsor pays the proprietor a flat fee. In some embodiments, the sponsor pays the proprietor for maintaining the first sequence in memory accessible to the computing device 100a for a certain period of time. The sponsor may also pay the proprietor an amount proportional to the number of views of the first sequence. The sponsor in some embodiments pays the proprietor an amount proportional to the number of views of combinations created according to this method, as set forth in more detail below, using the first sequence. The sponsor in some embodiments pays the proprietor for the number of combinations created according to this method, as set forth in more detail below, using the first sequence. In some embodiments, the sponsor pays the proprietor an amount determined by customer reviews by viewers of the first sequence. In some embodiments, the sponsor pays the proprietor an amount determined by customer reviews of combinations created pursuant to this method, as set forth in more detail below, using the first combination.

In some embodiments, the first sequence includes a hyperlink that displays when the first sequence plays, the selection of which causes the device displaying the first sequence to navigate to a website chosen by the sponsor. In some embodiments, the first sequence includes a hyperlink that displays when the first sequence plays, the selection of which causes the device displaying the first sequence to load an application chosen by the sponsor. In other embodiments, the first sequence includes one or more hyperlinks that display after the sequence finishes playing. The one or more hyperlinks may display for a certain period of time. The one or more hyperlinks may display until a further instruction from the user, such as the selection of a different sequence, interrupts their display. In some embodiments, the sponsor may pay a proprietor an amount determined by the number of users that select a hyperlink. In other embodiments, the sponsor pays the proprietor a commission on every sale initiated by the selection of the hyperlink. In some embodiments, the hyperlink allows the user to initiate the purchase of a good or service by means of a service provided by the proprietor. In other embodiments, the hyperlink allows the user to initiate the purchase of a good or service by means of a service provided by the sponsor.

The method 307 also includes receiving, by the first computing device, an instruction to produce a second sequence (326). In some embodiments, the user interface module 202 receives instructions as described above in connection with FIG. 3A (302). In some embodiments, receiving the instruction further includes receiving an instruction to replace at least one of the time-constrained videos in the first sequence with at least one other time-constrained video. In some embodiments, receiving the instruction further includes receiving an instruction to concatenate a second sequence containing at least one other time-constrained video to the end of the first sequence. In additional embodiments, receiving the instruction further includes receiving an instruction to concatenate a second sequence containing at least one other time-constrained video to the beginning of the first sequence. Under some embodiments, receiving the instruction further includes receiving an instruction to insert a second sequence containing at least one other time-constrained video between two of the time-constrained videos in the first sequence.

In some embodiments, receiving the at least one instruction further includes receiving an instruction to replace at least one sound file contained in the first video sequence with another sound file. In additional embodiments, receiving the at least one instruction further includes receiving an instruction to add at least one sound file to the first sequence. In some embodiments, receiving the at least one instruction further includes receiving an instruction to replace at least one caption sequence contained in the first video sequence with another caption sequence. In additional embodiments, receiving the at least one instruction further includes receiving an instruction to add at least one caption sequence to the first sequence.

Some embodiments permit a user to specify that subsequent users applying this method 307 may not change certain aspects of the first sequence. In some embodiments, receiving the at least one instruction further includes receiving a read-only instruction rendering some portion of the first sequence unalterable by other instructions. For example, a sponsor of the first sequence may instruct the system 200 to retain a portion of the sequence that identifies an advertised brand as an element of all combinations users produce pursuant to this method 307. In some embodiments, the read-only instruction renders at least one sound file contained in the first sequence unalterable. For instance, a sponsor may specify that a sound file that plays with the first sequence, and every combination created using the first sequence as provided in this method 307, will identify a brand associated with the sponsor.

In some embodiments, the read-only instruction renders at least one time-constrained video contained in the first sequence unalterable. As an example, a sponsor may specify that every sequence produced from the first sequence contain a time-constrained video displaying some imagery identifying an advertised brand. In additional embodiments, the read-only instruction renders at least one caption sequence in the first sequence unalterable. A sponsor of the first sequence may, for instance, specify that a caption must display the name of a brand associated with the sponsor for some portion of any combination produced using the first sequence pursuant to this method 307. In some embodiments, the read-only instruction renders a hyperlink inserted by a sponsor unalterable. In some embodiments, the read-only instruction renders the number of time-constrained videos in the first sequence unalterable. For instance, a sponsor of the first video sequence may specify that any combination produced using the first video sequence pursuant to this method 307 will be the same length at all times, to fit into an advertisement format in which the sponsor intends to use such combinations.

The method 307 further includes modifying the first sequence based on the at least one instruction to produce the second sequence (328). In some embodiments, the video combination module 204 performs the modification in the manner described above in connection with FIG. 3A (306). In some embodiments, the user interface module 202 informs a user attempting to enter an instruction that contradicts a read-only instruction that the instruction will not be carried out. For instance, the user interface module 202 may display an error message upon receiving an instruction. In other embodiments, displayed controls that would ordinarily permit a user to enter instructions are "greyed out" to indicate their unavailability to accept instructions contradicting a read-only instruction. In further embodiments, the user interface module 202 will display icons indicating that displayed controls are unavailable. For example, when the controls are unavailable, an icon in the form of a locked padlock may display on the screen to indicate unavailability.

In some embodiments, the user interface module 202 does not accept instructions that contradict a read-only instruction. The user interface module 202 may ignore input from a pointing device 127 coupled to the computing device where that input would instruct the video combination module 204 to act against a read-only instruction. In other embodiments, the user may be permitted to enter instructions contradicting a read-only instruction, but the video combination module 204 will not carry out those instructions.

In some embodiments, the method 307 further includes collecting, by the first computing device, data concerning the first and second sequences, and maintaining the collected data in memory accessible to the first computing device. In some embodiments, collecting the data includes enumerating the number of views of the first sequence. In additional embodiments, collecting the data includes enumerating the number of views of the second sequence. In other embodiments, collecting the data includes enumerating the number of views of a time-constrained video contained in the first or second sequence. In still other embodiments, collecting the data includes enumerating the number of edits of the first or second sequence. The collected data may enumerate the number of times a sequence is selected for editing. In other embodiments, collecting the data includes enumerating the number of edits of a time-constrained video within the sequence. The collected data may be combined; for instance, the data may compare the number of views of time-constrained videos within a sequence to each other. The data may enumerate occurrences in which a user views one portion of a sequence but not another; for example, if a user views the first half of a video but not the second half, this may indicate that the user did not like the video. The enumeration of views may enumerate the total number of views. The enumeration of views may enumerate the total number of distinct users that view a sequence or time-constrained video. The enumeration of views may enumerate the number of views per user. The collected data may enumerate the number of times a sequence is shared with a different platform. The collected data may include statistics concerning any determination of user enjoyment of videos or video sequences as described above in reference to FIG. 3A.

In some embodiments, collecting the data includes receiving, by the first computing device, reviews of at least one of the first and second sequences by persons who have viewed the at least one of the first and second sequences. The user interface module 202 may accept the reviews from input devices 130*b* coupled to the first computing device 100*a*. The user interface module may accept the reviews from a second computing device 100*b* via a network 104. The reviews may be textual comments entered by users of the system 200. The reviews may be quantitative ratings such as star ratings. In some embodiments, the first computing device 100*a* may aggregate quantitative ratings to produce an overall rating number. In some embodiments, collecting the data includes collecting personal data concerning persons who view at least one of the first and second sequences. The personal data may be collected from user accounts on the system 200 associated with the persons. The personal data may be collected from user accounts on other systems, such as social networking sites, associated with the persons. The personal data in some embodiments includes email addresses. The personal data in some embodiments contains identifiers associated with the persons in web-based communication sessions. The personal data in some embodiments includes Internet protocol addresses associated with the persons' computing devices. The personal data in some embodiments includes machine aliases associated with the persons' computing devices. In some embodiments, the personal data includes phone numbers associated with the persons' computing devices; for instance, where the computing devices are smart phones or mobile phones, the personal data may include the numbers of the phones.

In other embodiments, collecting the data includes collecting personal data concerning persons who created the at least one instruction. The personal data may be collected from user accounts on the system 200 associated with the persons. The personal data may be collected from user accounts on other systems, such as social networking sites, associated with the persons. The personal data in some embodiments includes email addresses. The personal data in some embodiments contains identifiers associated with the persons in web-based communication sessions. The personal data in some embodiments includes Internet protocol addresses associated with the persons' computing devices.

The personal data in some embodiments includes machine aliases associated with the persons' computing devices.

An additional embodiment includes transmitting, by the first computing device, the collected data to a third computing device. In some embodiments, a sponsor of the first sequence may receive the transmitted data. The sponsor may analyze the transmitted data to assess the market impact of the first sequence and combinations involving the first sequence. The sponsor may compensate a user who produced a second sequence that generates a large number of views. The sponsor may advertise prizes for users who can produce a second sequence that generates a large number of views.

Figure 4:
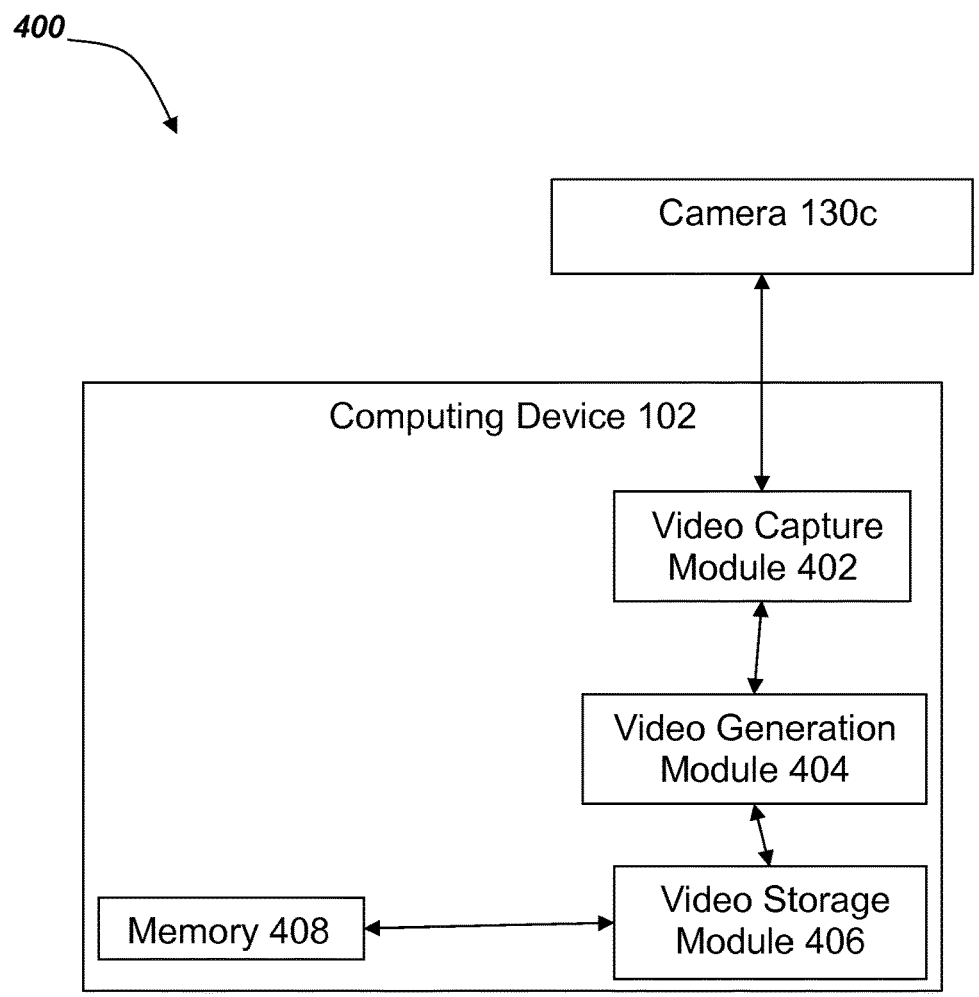
FIG. 4 is a block diagram depicting an embodiment of a system for creating time-constrained videos.

Referring now to FIG. 4, a block diagram depicts one embodiment of a system 400 for generating time-constrained videos. In brief overview, the system 400 includes a computing device 102 coupled to a camera 130c. The system 400 also includes a video capture module 402, video generation module 404, and a video storage module 406, executing on the computing device 102.

The system 400 includes a computing device 102 coupled to a digital camera 130c. In some embodiments, the digital camera 130c operates as described above in reference to FIG. 2. In some embodiments, the computing device 102 is a computing device 102 as described above with reference to FIGS. 1A-1C. In some embodiments, the computing device 102 is a mobile device, tablet, laptop, netbook, or computer 100 as described above in reference to FIG. 2. The computing device 102 may also be connected to an additional computing device 102 (not shown), which relays video content to the computing device 102 from the digital camera 130c. The system 200 in some embodiments also includes a motion capture device accessible to the computing device. A motion capture device is an input device 130b that transmits a signal to a computing device when the motion capture device is caused to move through space in a particular pattern. The motion capture device may be integrated into the camera device 130c. The motion capture device may be integrated into the computing device 102.

In some embodiments, the video capture module 402 executes on the computing device 102 and receives captured video content from the camera 130c. The video capture module 402 may operate as part of a software application executing on the computing device 102. The video capture module 402 may also operate as a hardware component on the computing device 102. In some embodiments, the video capture module 402 operates on the camera device 130c. The video capture module 402 may operate as part of a software application executing on the camera device 130c. The video capture module 402 may also operate as a hardware component on the camera device 130c.

In some embodiments, the video generation module 404 executes on the computing device 102. The video generation module 404 may operate as part of a software application executing on the computing device 102. The video generation module 404 may also operate as a hardware component on the computing device 102. In some embodiments, the video generation module 404 operates on the camera device 130c. The video generation module 404 may operate as part of a software application executing on the camera device 130c. The video generation module 404 may also operate as a hardware component on the camera device 130c.

In some embodiments, the video storage module 406 executes on the computing device 102 and maintains the time-constrained video in memory 408 accessible to the computing device. In some embodiments, the video storage module 406 operates as part of a software application executing on the computing device 102. The video storage module 406 may also operate as a hardware component on the computing device 102. In some embodiments, the video storage module 406 operates on the camera device 130c. The video storage module 406 may operate as part of a software application executing on the camera device 130c. The video storage module 406 may also operate as a hardware component on the camera device 130c. The memory where the video storage module 406 maintains time-constrained videos may be integrated in the camera device 130c. In some embodiments, the memory is integrated in the computing device 102. The memory may also be part of another computing device 102 (not shown) that connects to the computing device 102 via a network 104. The memory may be located on a remote server 106 (not shown) that connects to the computing device 102 via a network 104.

Although for ease of discussion the video capture module 402, video generation module 404, and video storage module 406 are described as separate modules, it should be understood that this does not restrict the architecture to a particular implementation. For instance, these modules may be encompassed by a single circuit or software function.

Figure 5:
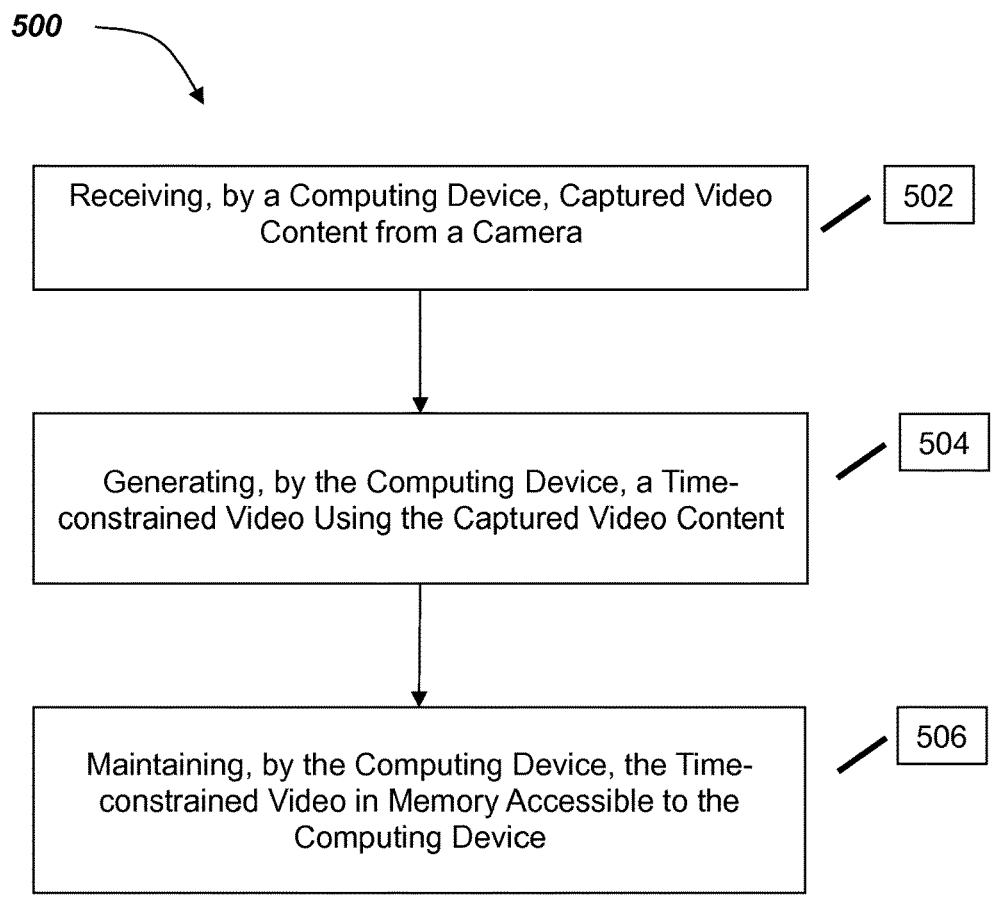
FIG. 5 is a flow diagram depicting an embodiment of a method for combining and sharing time-constrained videos.

Referring now to FIG. 5, a flow diagram depicts one embodiment of a method 500 for combining and sharing time-constrained videos. In brief overview, the method 500 includes receiving, by a computing device, captured video content from a camera (502). The method 500 additionally includes generating, by the computing device, a time-constrained video using the captured video content (504). The method 500 also includes maintaining, by the computing device, the time-constrained video in memory accessible to the computing device (506).

Referring now to FIG. 5 in greater detail, and in connection with FIG. 4 the method 500 includes receiving, by a computing device, captured video content from a camera (502). In some embodiments, the camera records the captured video content and creates a file, which is transferred to the computing device 102. The file may be transferred directly to the computing device 102 while the camera is connected to the computing device. The file may be transferred to the computing device 102 by means of portable data storage such as a secure digital (SD) card. The file may be transferred to the computing device from another computing device 102 (not shown) that is connected to the computing device over a network 104. In other embodiments, captured video content is fed continuously to the computing device 102 by a camera that communicates with the computing device. The camera may be directly connected to the computing device. The camera may be connected to the computing device via a network 104. In some embodiments, the camera captures the video content much earlier than the computing device uses the video content to generate a time-constrained video. For instance, the video generation module 404 may use a video uploaded to a device connected to the network 104 to generate the time-constrained video. The video generation module 404 may use a video uploaded from a device connected to the network 104 to generate the time-constrained video.

In some embodiments, receiving the video content includes receiving audio content. In some embodiments, receiving the video content includes receiving video and audio content simultaneously. In other embodiments, the method 500 further includes receiving solely audio content, which the computing device makes into a sound file. In other embodiments, the computing device receives audio content in the form of a pre-recorded sound file.

In some embodiments, receiving the video content further includes measuring, by the computing device, the time elapsing during reception of the video content, comparing, by the computing device, that measurement to the time constraint, and displaying, by the computing device, to an operator of the camera, a signal communicating the results of that comparison. The signal may be displayed using a monitor or similar display screen coupled to the computing device 102. The signal may also be displayed by means of one or more lights coupled to the computing device 102. The signal may be displayed using a sound produced by speakers or similar output devices 130a coupled to the computing device. The signal may be displayed to the user via haptic communication such as the vibration of a mobile device.

The signal may be an indication that the duration of the video content being recorded has reached the time constraint. The signal may indicate to the operator of the camera or the computing device 102 that the duration of the video will imminently reach the time constraint. The signal may indicate to the operator how much time is left within the time constraint, by presenting the operator with a countdown. The signal may indicate to the operator how much time is left within the time constraint by modulating a colored light. The signal may indicate to the operator how much time is left within the time constraint by modulating the pitch or intensity of a sound. In some embodiments, the camera 130c signals the results of the measurement.

In some embodiments, receiving captured video content further includes receiving, by the computing device, a signal from a motion capture device, receiving, by the computing device, a second signal from a motion capture device, and receiving, by the computing device, video content only between the first signal and the second signal. In some embodiments, the signal from the motion capture device to begin recording is triggered by the user raising the motion capture device to eye-level. The camera device may be raised to eye level at the same time as the motion capture device. In some embodiments, the signal from the motion capture device to cease recording is triggered by dropping the motion capture from eye level to a different plane. In some embodiments, the motion that triggers the beginning of recording is the same as the motion that triggers the ending of recording. In other embodiments, the beginning of recording is signaled by selecting a recording button; the recording button may be a physical button. The recording button may be a button shown on a display associated with the computing device.

The method 500 additionally includes generating, by the computing device, a time-constrained video using the captured video content (504). Some embodiments involve receiving video content in the form of a file that is already time-constrained. In some embodiments, the measurement of time remaining described above may result in an automatic termination of recording to ensure that the video recorded is of the correct length. In some embodiments, generating the time-constrained video further includes receiving, by the computing device, a video of greater duration than the time constraint and compressing, by the first computing device, the video to a duration substantially equal to the time constraint. Where the visual display occasioned by the time-constrained video simulates the visual experience of viewing objects and events in the real world, the visual display may be compressed so that the events it portrays occur at an accelerated pace. For example, the visual display could portray a "time lapse" video in which an occurrence that when recorded lasted minutes or hours appears to take place in its entirety in a few seconds. A visual display thus manipulated to produce such an accelerated effect is referred to herein as "compressed," and the act of producing it is referred to as "compressing" the video. In some embodiments, one part of the compressed video could proceed at its original pace, while another part is accelerated such that the entire video fits within the applicable time constraint. In some embodiments, the user can specify the degree to which a portion of the video content will accelerate to compress that portion of the video content.

In other embodiments, generating the time-constrained video further includes receiving, by the computing device, a video of lesser duration than the time constraint and expanding, by the first computing device, the video to a duration substantially equal to the time constraint. Where the visual display occasioned by the time-constrained video simulates the visual experience of viewing objects and events in the real world, the visual display may be expanded so that the events it portrays occur at a protracted pace. For example, the visual display could portray a "slow motion" video in which an occurrence that when recorded lasted for half of the time constraint is presented as taking the entire time constraint to occur. A visual display thus manipulated to produce such a protracted effect is referred to herein as "expanded," and the act of producing it is referred to as "expanding" the video. In some embodiments, the user can specify the degree to which a portion of the video content will be compressed.

In some embodiments, the video generation module 404 compresses some parts of the video content and expands other parts, based on instructions received from the user. In some embodiments, the video generation module 404 reverses at least a part of the captured content so that it plays backwards when the time-constrained video is played. In some embodiments, the video generation module 404 may crop video content that is longer in duration than the time constraint, so that the cropped video content has duration equal to the time constraint.

In some embodiments, the computing device receives a sound file longer in duration than the time constraint, and compresses it to duration substantially equal to the time constraint. In some embodiments, one part of the compressed sound file could proceed at its original pace, while another part is accelerated such that the entire sound file fits within the applicable time constraint. In some embodiments, the user can specify the degree to which a portion of the sound file will accelerate to compress that portion of the sound file. In some embodiments, the sound file is of duration less than the time constraint, and is expanded to duration substantially equal to the time constraint. In some embodiments, the user can specify the degree to which a portion of the sound file is slowed down to expand the sound file as a whole to fit the time constraint. In some embodiments, the computing device compresses some parts of the sound file and expands other parts, based on instructions received from the user. In some embodiments, the computing device reverses at least a part of the sound file so that it plays backwards when the time-constrained video is played. In some embodiments, the computing device may crop a sound file that is longer in duration than the time constraint, so that the cropped sound file content has duration equal to the time constraint. In some embodiments, the category of sound file the user can upload depends on the computing device the user is using; for instance, a user may be able to upload only certain categories of sound files from a mobile phone.

In some embodiments, the video generation module 404 applies a filter to the video content while generating the time-constrained video. In some embodiments, the video capture component 402 applies a filter to the video content while receiving the video content. A filter may be set of visual enhancements that alter the appearance of video content. For example, a black and white filter in some embodiments could give the time-constrained video the appearance of having been shot on black and white film. A sepia filter may give the entire video the appearance of having been shot through a sepia-colored piece of glass or cellophane, causing the entire time-constrained video to appear brown-colored. In other embodiments, filters may use virtual striations, hairs, and dust-marks to make the time-constrained video appear to be recorded on aging cinematic film. In other embodiments, the still image of a frame may be superimposed around the time-constrained film, in the manner of a silent movie. In additional embodiments, the filter alters the brightness level of the time-constrained video; for instance, a time-constrained video shot in a dark location may be brightened by a filter. In other embodiments, the filter alters the contrast level of the time-constrained video.

The method 500 also includes maintaining, by the computing device, the time-constrained video in memory accessible to the computing device (506). The video storage module 406 may maintain the time-constrained video file in the main memory 122 of the computing device 102. The memory may be in another computing device 102 (not shown) that is linked to the computing device by a network 104. The video storage module 406 may transmit the time-constrained video to a remote server 106 linked to the computing device by a network 104. In some embodiments, the memory is a cloud storage service, enabling the user to access the memory from additional client devices (not shown) as well as from the computing device 102. In some embodiments, the client device 102 automatically finds all time-constrained videos stored on the computing device 102 and uploads the videos to a remote server 106. The computing device 102 may find the videos using any algorithm for finding a category of file within a data organization system of a computing device 102. The computing device 102 may display to the user a request for an instruction to upload the videos and proceed with uploading only if the user enters the requested instruction.

Some embodiments of the method 500 involve further use of user interface elements to guide the user through the process in the method 500. For instance, in some embodiments, selecting and holding down the recording button for longer than a threshold period of time causes an upload sequence to begin. In some embodiments, the computing device 102 performs the upload sequence by opening a set of video files on the computing device 102, accepting a user instruction selecting a video from the set, and guiding the user through the process of converting the video into a time constrained video, as set forth in further detail below. In some embodiments, the upload sequence begins automatically when the user starts a computer program on the computing device 102 that performs the method 500.

Figure 6:
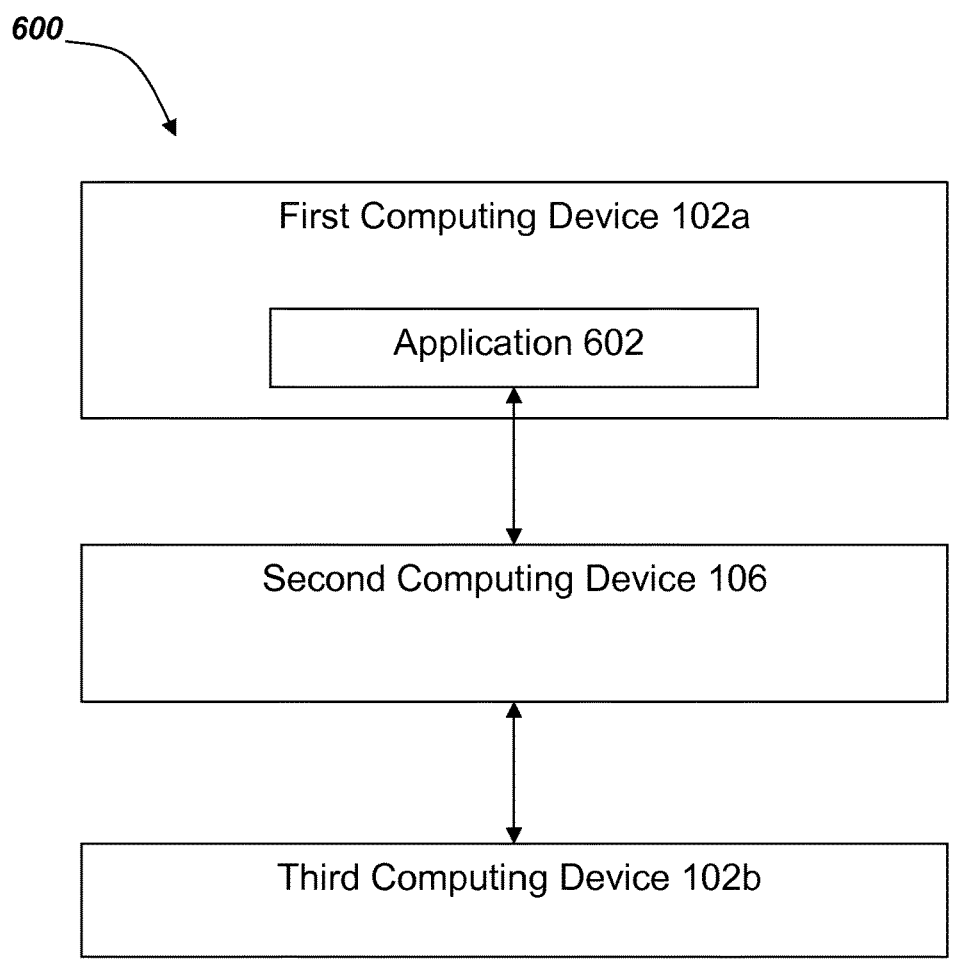
FIG. 6 is a block diagram depicting an embodiment of a system for creating time-constrained videos.

Referring now to FIG. 6, a block diagram depicts one embodiment of a system 600 for sharing time-constrained video reviews. In brief overview, the system 600 includes an application 602 executing on a first computing device 102a. The system 600 also includes a second computing device 106 receiving, from the application 602, the time constrained video and providing the time-constrained video to a third computing device 102b.

The first computing device 102a may be a client device as set forth above in reference to FIGS. 1A-1C. In some embodiments, the first computing device 102a is connected to a camera 130c (not shown), permitting it to capture time-constrained videos in the manner described above in reference to FIG. 5. The first computing device may be coupled to input and output devices 130a-b (not shown) that permit the user to enter text and edit the review as necessary.

In some embodiments, an application executing on the first computing device 102a creates reviews of products or services using time-constrained videos. The application in some embodiments is a software application executing on the first computing device.

According to some embodiments, the second computing device 106 is a server connected to the first computing device by a network 104. The second computing device 106 may have a repository in its memory for storing reviews generated on the first computing device 102a. The second computing device 106 may host a web page for displaying reviews. The second computing device 106 may communicate via the network 104 with another computing device 106 (not shown), which hosts a web site on which the reviews may be posted.

In some embodiments, a user uses the third computing device 102b to view reviews created with time-constrained videos. In some embodiments, the third computing device 102b has a web browser to view reviews presented by the second computing device 106. In some embodiments, the third computing device 102b has an application that displays reviews that contain time-constrained videos.

Figure 7:
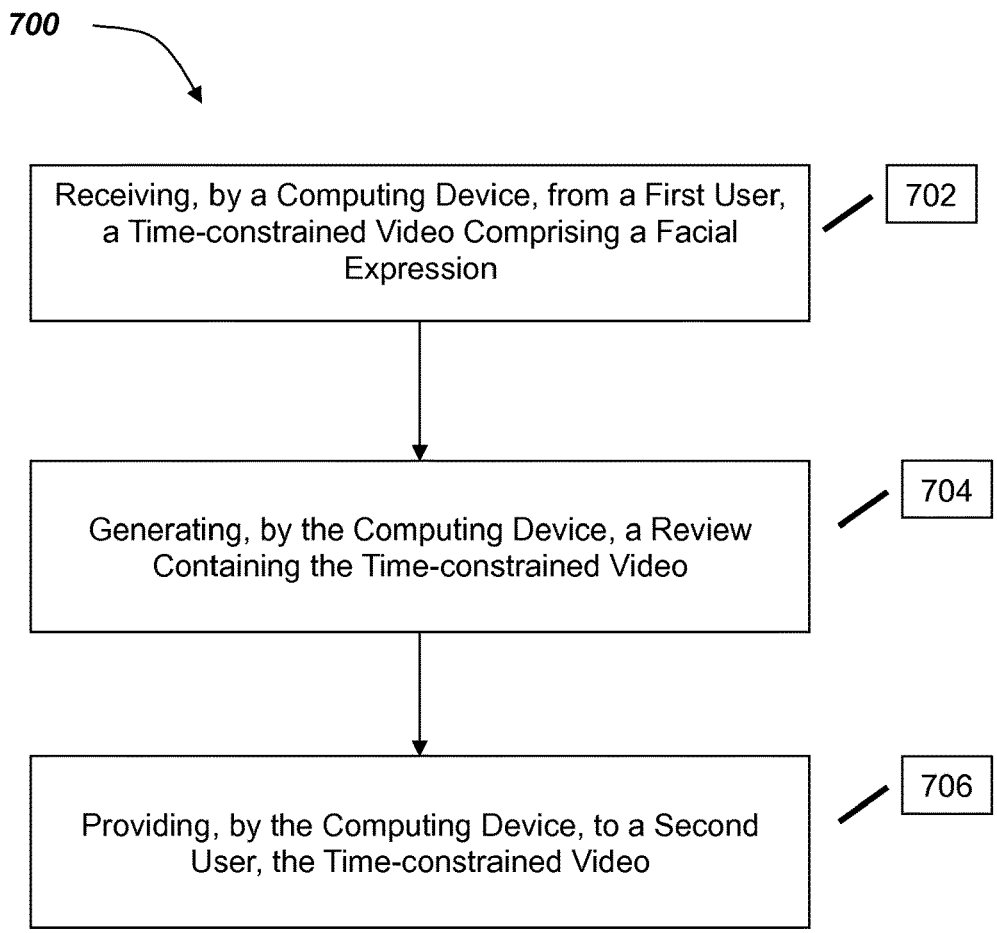
FIG. 7 is a flow diagram depicting an embodiment of a method for creating and sharing product reviews containing time-constrained videos.

Referring now to FIG. 7, a flow diagram depicts one embodiment of a method 700 for creating reviews using time-constrained videos. In brief overview, the method 700 includes receiving, by a computing device, from a first user, a time-constrained video comprising a facial expression (702). The method also includes generating, by the computing device, a review containing the time-constrained video (704). The method additionally includes providing, by the computing device, to a second user, the time-constrained video (706).

Referring now to FIG. 7 in greater detail, and in connection with FIG. 4, the method 700 includes receiving, by a computing device, from a first user, a time-constrained video comprising a facial expression (702). The time-constrained video may be produced as set forth above in reference to FIGS. 3 and 6. The time-constrained video may also be stored locally on the computing device 106. In some embodiments, the time-constrained video is received by the computing device 106 from another computing device 102 (not shown).

The method also includes generating, by the computing device, a review containing the time-constrained video (704). In some embodiments, generating the review further includes accepting user inputs in the form of text and combining the user inputs with the time-constrained video. The user inputs may describe the product or service that the user is reviewing. The user inputs may contain further information about the user's experience with the product or service that the user is reviewing. In some embodiments, the user inputs include numerical ratings of the product or service. In some embodiments generating the review further includes linking the time-constrained video to a file containing a description of a product or service. The file to which the time-constrained video is linked may be on a different machine such as a remote server 106.

The method additionally includes providing, by the computing device, to a second user, the time-constrained video (706). In some embodiments, the computing device 106 provides the review to another computing device 102 via a network 104 connecting the two devices. The computing device 106 may provide the review via hypertext transfer protocol in the form of a web page displayed on another computing device 102. The review may also be transmitted to a second server 106b (not shown). The server 106b may be an electronic mail server. The server 106b may be a server maintained by a social media service provider such as, without limitation, Facebook, Inc. of Menlo Park, Calif. or Twitter, Inc. of San Francisco, Calif. The server 106b may be a server that provides short message services (e.g., SMS and iMessage). The server 106b may host a website offering products or services for sale. In some embodiments, the review is posted to a set of reviews concerning the product or service that is the review's subject.

Figure 8:
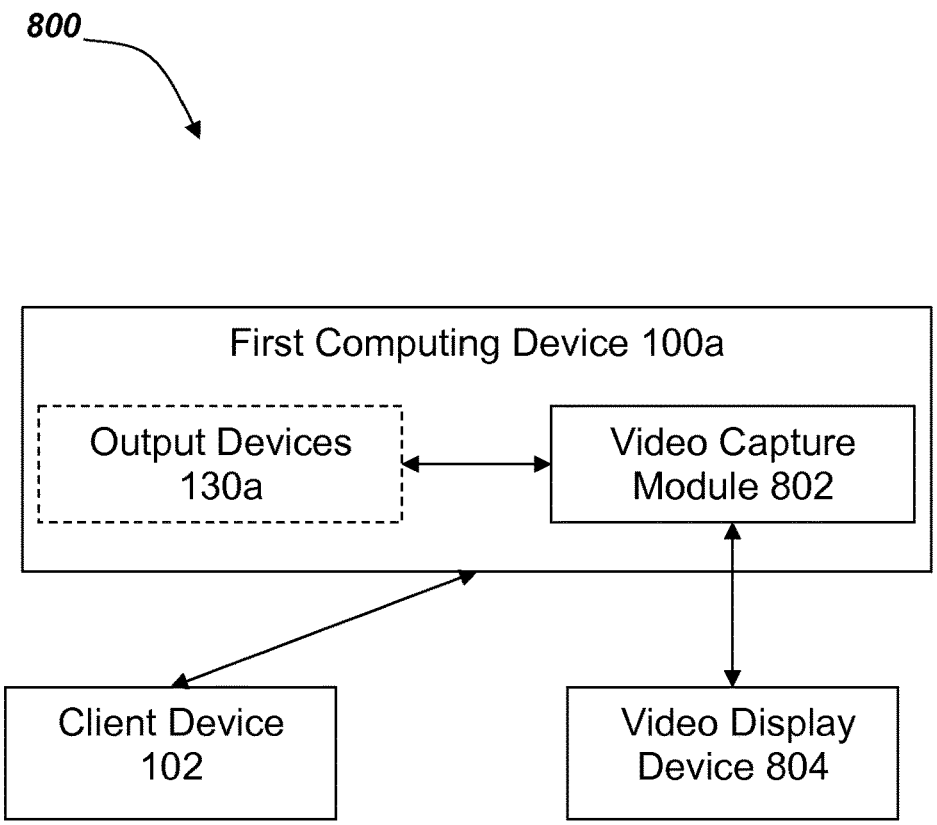
FIG. 8 is a block diagram depicting an embodiment of a system for generating time-constrained videos from an audiovisual data feed.

Referring now to FIG. 8, a block diagram depicts another embodiment of a system for capturing and deriving time-constrained videos from streaming or broadcast feeds. In brief overview, the system 800 includes a first computing device 100a. The system 800 also includes a video capture module 802. In some embodiments, the system 800 may include a video display device 804 separate from the first computing device 100a. The system 800 may include a plurality of client devices 102.

The system 800 includes a first computing device 100a. In some embodiments the first computing device 100a is a machine 106 as described above in reference to FIGS. 1A-1C. In other embodiments, the first computing device 100a is a machine 100a as described above in connection with FIG. 2.

In some embodiments, the video capture module 802 provides functionality for receiving an identification of a portion of an audiovisual data feed. In other embodiments, the video capture module 802 provides functionality for receiving an instruction to generate a time-constrained video from the portion of the audiovisual feed. In still other embodiments, the video capture module 802 provides functionality for generating a time-constrained video from a portion of an audiovisual data feed. In further embodiments, the video capture module 802 provides the functionality of the video combination module 204.

In some embodiments, the video display device 804 is a high-definition television and the first computing device 100a is a smartphone or a tablet. In other embodiments, the video display device 804 is a desktop computer and the first computing device 100a is a smartphone. In further embodiments, the video display device 804 is an output device 130 and the first computing device 100a is any type of machine 100. In some embodiments, the first computing device 100a is a special-purpose device in communication with the video display device 804. For instance, where the video display device includes a high-definition television, cable box, satellite box or other video-streaming device, the first computing device 100a may be a digital video recorder ("DVR") linked to the video display device. The first computing device 100a may be a hand-held device that communicates with the video streaming device via a wireless or wired connection, as described above in reference to FIGS. 1A-1B. The hand-held device may be a special-purpose device. The hand-held device may be a general-purpose mobile device configured to perform the actions of the first computing device 100a as set forth more fully below. The first computing device 100a may communicate with a handheld device by means of which the user performs inputs as set forth above in connection with FIGS. 1A-2.

In one embodiment, the video capture module 802 includes a user interface module 202 as described above in connection with FIG. 2. In other embodiments, the video display device 804 provides the functionality of a user interface module 202. In further embodiments, and as will be described in greater detail below, functionality for viewing an audiovisual data feed (e.g., streaming or broadcast feeds) and generating time-constrained videos from the audiovisual data feed is distributed between the first computing device, which is executing the video capture module 802, and the video display device 804, which allows the user to view the audiovisual data feed.

In one embodiment, streaming or broadcast feeds comprise programs or other longer video content (e.g., television programs, movies, or sequences from video games), either broadcast live in real time, or previously recorded, whether delivered by radio transmission, cable, fiber optic network, cellular or other wireless network, Internet, satellite, or other similar means. In some embodiments, the content is a television show. In other embodiments, the content is a feature-length film. In other embodiments, the content is a sequence of play or action from a video or computer game in a multi-player mode. In other embodiments, the content is a live broadcast event, such as a sporting event, a concert or other performance, an awards ceremony, a live performing arts competition, a "reality television" program, or a live news program, such as a speech or press conference of public interest, or a live broadcast of "breaking news." In still other embodiments, the content is live but not transmitted or broadcast over public airwaves, cable, or via satellite, such as, for example, conferences, speeches, lectures, seminars, performances, press conferences, awards ceremonies, and other events that are transmitted via closed circuit television, or "simulcast," from a select location where the event is held live to one or more additional locations where other viewers are watching simultaneously. In some embodiments, the content is professionally produced. In one of these embodiments, a professional creating the content grants licenses or other distribution rights allowing other users, professional or otherwise, to use some or all of the content in their own derivative works. In other embodiments, non-professionals produce the content. In one of these embodiments, a non-professional creating the content grants licenses or other distribution rights allowing other users, professional or otherwise, to use some or all of the content in their own derivative works. In still other embodiments, the content is a sequence of play or action from a video or computer game in a single-player mode and not transmitted or broadcast over public airwaves, cable, or via satellite.

In one embodiment, the system 800 includes a client device 102 on which a user of the client device 102 may view a streaming or broadcast feed, or multiple streaming or broadcast feeds simultaneously, from which one or more portions may be captured to create time-constrained videos, using the video capture module 802. In some embodiments, a streaming or broadcast feed will be available in the form of one or more time-constrained videos that have already been created by the provider of the particular streaming or broadcast feed, corresponding, for example, to the "cuts" or scene changes that were added together by the content provider to create the longer work in the first place, including, for example, both scenes and cuts that were included in the longer work as broadcast and "deleted scenes" that were not included. The entire length of the streaming or broadcast feed may be available in the form of time-constrained videos, or only select portions of the streaming or broadcast feed may be so available. In further embodiments, the content provider may itself create and share time-constrained videos or sequences of time-constrained videos contemporaneous with the streaming or broadcast of a longer work from which the time-constrained videos were captured.

In some embodiments, the system 800 may include a plurality of devices. For example, the video capture module 802 may execute on a first computing device 100*a* in communication with a video display device 804. In one of these embodiments, the video display device 804 is used for watching the streaming or broadcast feeds, and the first computing device 100*a* provides access to a record or capture function, along with rewind, pause, and fast-forward functions, and columns or rows of user-created videos in which the user's recorded or captured segments are visible, or in which other users' segments recorded from the same streaming or broadcast feed are visible. In other embodiments, the video display device 804 is used for watching the streaming or broadcast feeds and also contains columns or rows of user-created videos in which the user's recorded or captured segments are visible, or in which other users' segments recorded from the same streaming or broadcast feed are visible, while the first computing device 100*a* contains only the record or capture function, along with rewind, pause, and fast-forward functions.

In some embodiments, the system 800 includes a video display device 804, a first computing device 100*a*, and a plurality of client devices 102, allowing two or more people watching the same streaming or broadcast feed in the same physical space to capture segments from that feed together as a social activity, with all of the machines synced together. In some of these embodiments, the video display device 804 is used for watching the streaming or broadcast feeds, and the first computing device 100*a* and plurality of client devices 102 each contain a record or capture function, along with rewind, pause, and fast-forward functions, and columns or rows of user-created videos in which the user's recorded or captured segments are visible, or in which other users' segments recorded from the same streaming or broadcast feed are visible. In other embodiments, the video display device 804 is used for watching the streaming or broadcast feeds and also contains columns or rows of user-created videos in which the user's recorded or captured segments are visible, or in which other users' segments recorded from the same streaming or broadcast feed are visible, while the first computing device 100*a* and plurality of client devices 102 each contain the record or capture function, along with rewind, pause, and fast-forward functions.

In some embodiments, the video display device 804, the first computing device 100*a*, and the plurality of client devices 102 are synchronized such that an individual user's instruction to record on the first computing device 100*a* results in the capture of a segment from the streaming or broadcast feed being played on the video display device 804. The synchronization may be performed using any technology for linking two or more devices together as described above in reference to FIGS. 1A-1C, including near-field communication and communication via intermediary devices such as routers and servers. In other embodiments, the video display device 804 is a high-definition television and the first computing device 100*a* and plurality of client devices 102 could each be a smartphone, a tablet, or other computing device 100. In other embodiments, the video display device 804 could be a projector, or a large public video display, such as a JUMBOTRON or video wall used at a live sporting event, live concert or other performance, or a public display of a film, or in a public space such as an urban center, a shopping mall, a museum, an airport or other transit center, or an amusement park, and the first computing device 100*a* and plurality of client devices 102 could each be a smartphone, a tablet, or other computing device 100 containing a record or capture function, along with rewind, pause, and fast-forward functions, and columns or rows of user-created videos in which the user's recorded or captured segments are visible, or in which other users' segments recorded from the same streaming or broadcast feed are visible. In one of these embodiments, by way of example, a user attending a sporting event, concert, performance, or other public event may view a live broadcast or stream of the event on the display device 804 and use the client device 102 to identify portions of the live broadcast displayed in the display device 804 for use in generation of time-constrained videos. For example, while generating at least one entry in a micro blog related to the event (e.g., while "live tweeting" or "live blogging" the event), a user may include in the at least one entry a time-constrained video containing audiovisual data captured from the display device 804.

Figure 9:
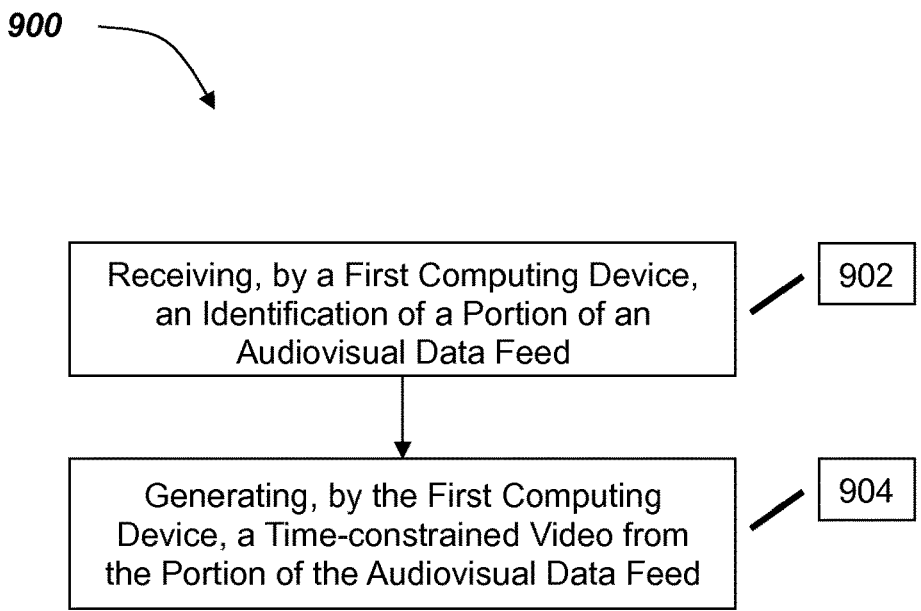
FIG. 9 is a flow diagram depicting an embodiment of a method for generating time-constrained videos from an audiovisual data feed.

Referring now to FIG. 9, a flow diagram depicts one embodiment of a method 900 for generating time-constrained videos from an audiovisual data feed. In brief overview, the method 900 includes receiving, by a first computing device, an identification of a portion of an audiovisual data feed (902). The method 900 includes generating, by the first computing device, a time-constrained video from the portion of the audiovisual data feed (904).

Referring now to FIG. 9 in greater detail, and in connection with FIG. 8, the method 900 includes receiving, by a first computing device, an identification of a portion of an audiovisual data feed (902). In one embodiment, the first computing device 100*a* receives the identification from a user viewing the audiovisual data feed, such as a user of the first computing device 100*a*. In another embodiment, the first computing device 100*a* receives the identification from a second computing device, such as a client 102.

In one embodiment, the first computing device 100*a* provides a user of the first computing device 100*a* with access to a broadcast of an audiovisual data feed, or to broadcasts of multiple audiovisual feeds simultaneously. In some embodiments, the first computing device 100*a* transmits a broadcast of an audiovisual data feed to a second computing device 102 from which a user may view the broadcast. In one of these embodiments, the second computing device 102 may execute the video capture module 802 allowing the user to select portions of the audiovisual data feed for use in generating time-constrained videos. In another of these embodiments, the second computing device 102 may generate a user interface with which the user may generate and transmit instructions to the video capture module 802 executing on the first computing device 100*a*.

The first computing device 100*a* may receive, from the second computing device 102, the identification of the portion of the audiovisual data feed. The first computing device 100*a* may receive, from the second computing device 102, an instruction to generate a time-constrained video from the identified portion of the audiovisual data feed. The first computing device 100*a* may receive from the second computing device 102, an instruction to generate a sequence including the generated time-constrained video and a second time-constrained video. For example, the instruction may specify a second time-constrained video generated by the user, from the audiovisual data feed or from another audiovisual data feed, or any time-constrained video in a library of video sequences accessible by the user.

When viewing a streaming or broadcast feed using the video capture module 802, a user may select a record or capture function that records the video segment playing at that moment on the streaming or broadcast feed and saves it to a collection of video footage from which the system may create time-constrained videos. In some embodiments, the segment so recorded will already be a time-constrained video previously created by the provider of the particular streaming or broadcast feed, so that when the user chooses to record a segment of the feed, the user will not need to stop recording, and a time-constrained video will automatically be saved to the user's collection (e.g., a producer of a television show may divide the audiovisual data into time-constrained video segments prior to streaming or broadcasting the audiovisual data to the user). In other embodiments, the user will be creating a custom or freestyle video and will need to select a pause or stop function that halts the recording of the video segment, which may be longer than a specified time constraint and require that the user crop video content that is longer in duration than the time constraint so that the cropped video content has duration equal to the time constraint, or which may be shorter than the constraint and can be saved to the user's collection of time-constrained videos.

The video capture module 802 may generate output for display on a computing device 100a, with a viewing window for watching the streaming or broadcast feeds, a record or capture function, along with rewind, pause, and fast-forward functions, and columns or rows of user-created videos in which the user's recorded or captured segments are visible, or in which other users' segments recorded from the same streaming or broadcast feed are visible. Additionally, the user-created videos may also include sequences of time-constrained videos that include videos captured from the same streaming or broadcast feed, whether by that individual user or by other users. All of the videos or sequences including content captured from the same streaming or broadcast feed may be designated and discovered by use of metadata, such as a hash tag (including, e.g., a hash tag containing the season and episode numbers of a television show, or the opponents in a sporting event), so that they may be found and grouped together to allow users to view and alter one another's videos and sequences, regardless of the time at which the various users captured their segments. In some embodiments, the users will all be capturing segments from a broadcast feed of the same live event, such that the capturing and creation of time-constrained videos and sequences will occur contemporaneously or in real time. In other embodiments, a plurality of users will watch the same streaming feed at different times and can each capture segments and create time-constrained videos and sequences at various times.

The first computing device generates a time-constrained video from the portion of the audiovisual data feed (904). In one embodiment, the first computing device 100a receives an identification of a user-generated time-constrained video and an instruction to incorporate the time-constrained video generated from the portion of the audiovisual data feed with the user-generated time-constrained video. In some embodiments, the first computing device 100a generates the time-constrained video as described above in connection with FIG. 3A. In some embodiments, the first computing device 100a generates the time-constrained video as described above in connection with FIG. 5. In some embodiments, such as distributed embodiments, the video display device 804 and the first computing device 100a are synchronized such that the user's instruction to record on the first computing device 100a results in the capture of a segment from the streaming or broadcast feed playing on the video display device 804.

In some embodiments, the first computing device 100a generates the time-constrained video and receives an instruction to combine the time-constrained video with a second time-constrained video, resulting in a sequence of time-constrained videos. In one of these embodiments, the first computing device 100a combines a time-constrained video generated from a professionally produced feed with a time-constrained video generated by a viewer of the professionally produced feed; the viewer may be a professional or a non-professional consumer of the feed. In some embodiments, the first computing device 100a combines the generated sequence with at least one time-constrained video containing advertising content, as described above in connection with FIG. 3A.

In some embodiments, the first computing device 100a combines a first time-constrained video generated from a professionally produced feed with a second time-constrained video generated from the professionally produced feed. In one of these embodiments, by way of example, a feed containing a motion picture may include a section after the credits that features outtakes, commentary, deleted scenes, alternative camera angles or audio feeds, or other audiovisual data that did not form a primary part of the movie or television program; a user of the first computing device 100a may use portions of the feed to create a new combination of audiovisual data, such as an annotated version of the movie or a version of the movie with an alternative storyline. As another example, the user may use portions of the feed to create new combinations of audiovisual data that include time-constrained videos created by the user, for example and without limitation, fan fiction, reviews, or other derivative works.

Figure 10:
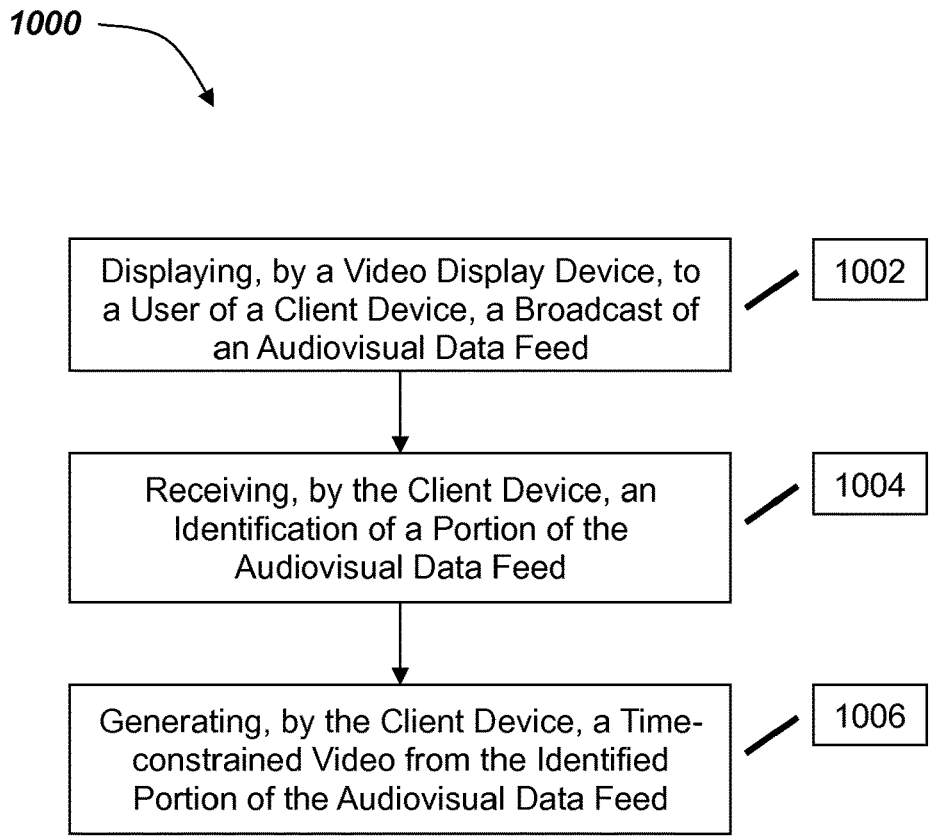
FIG. 10 is a flow diagram depicting an embodiment of a method for generating time-constrained videos from an audiovisual data feed.

Referring now to FIG. 10, a flow diagram depicts one embodiment of a method 1000 for generating time-constrained videos from an audiovisual data feed. In brief overview, the method 1000 includes displaying, by a video display device, to a user of a client device, a broadcast of an audiovisual data feed (1002). The method 1000 includes receiving, by the client device, an identification of a portion of the audiovisual data feed (1004). The method 1000 includes generating, by the client device, a time-constrained video from the identified portion of the audiovisual data feed (1006).

Referring now to FIG. 10 in greater detail, and in connection with FIGS. 8 and 9, the method 1000 includes displaying, by a video display device, to a user of a client device, a broadcast of an audiovisual data feed (1002). In one embodiment, displaying is implemented as disclosed above in connection with FIG. 9. Some embodiments further include providing, by the client device, the user with an interface for sharing the generated time-constrained video. In one embodiment, the user is provided with an interface for sharing the generated time-constrained video as described above in connection with FIG. 9. Displaying may further include displaying a broadcast of a live event; displaying a broadcast of a live event may be implemented as disclosed above in connection with FIG. 9.

The method 1000 includes receiving, by the client device, an identification of a portion of the audiovisual data feed (1004). In one embodiment, receiving is implemented as disclosed above in connection with FIG. 9.

The method 1000 includes generating, by the client device, a time-constrained video from the identified portion of the audiovisual data feed (1006). In one embodiment, generating is implemented as disclosed above in connection with FIG. 9. In some embodiments, generating further involves determining, by the client device, that a provider of the broadcast divided the audiovisual data feed into segments prior to broadcasting the audiovisual data feed, and providing, by the client device, the user with access to a time-constrained video based on the provider-divided segment. Other embodiments further include receiving an instruction to combine the generated time-constrained video with a second time-constrained video. The instruction may be received as disclosed above in connection with FIG. 3A.

Figure 11:
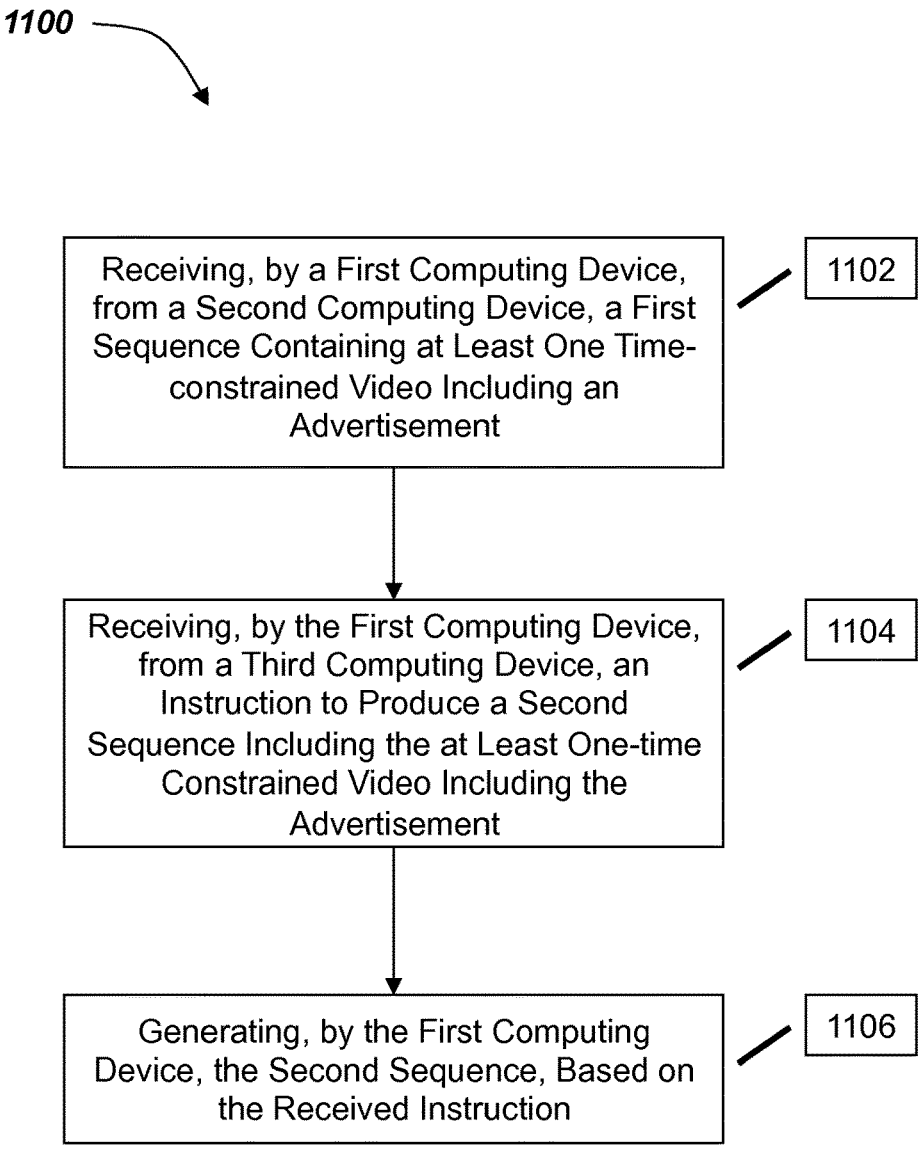
FIG. 11 is a flow diagram depicting an embodiment of a method for modifying a sequence of time-constrained videos having one or more advertisements.

Referring now to FIG. 11, a flow diagram depicts one embodiment of a method 1100 for modifying a sequence of time-constrained videos having one or more advertisements. In brief overview, the method 1100 includes receiving, by a first computing device, from a second computing device, a first sequence containing at least one time-constrained video including an advertisement (1102). The method 1100 includes receiving, by the first computing device, from a third computing device, an instruction to produce a second sequence including the at least one-time constrained video including the advertisement (1104). The method 1100 includes generating, by the first computing device, the second sequence, based on the received instruction (1106).

Referring now to FIG. 11 in greater detail, and in connection with FIG. 2, the method 1100 includes receiving, by a first computing device, from a second computing device, a first sequence containing at least one time-constrained video including an advertisement (1102). In one embodiment, receiving the first sequence is implemented as disclosed above in reference to FIGS. 3A and 3E.

The method 1100 includes receiving, by the first computing device, from a third computing device, an instruction to produce a second sequence including the at least one-time constrained video including the advertisement (1104). In one embodiment, receiving the instruction is implemented as described above in reference to FIGS. 3A and 3E.

The method 1100 includes generating, by the first computing device, the second sequence, based on the received instruction (1106). In one embodiment, generating is implemented as described above in reference to FIGS. 3A and 3E. Some embodiments further include charging, by the first computing device, to a creator of the first sequence, a fee based on a number of views of the second sequence. Charging the fee may be implemented as disclosed above in reference to FIGS. 3A and 3E.

Figure 12:
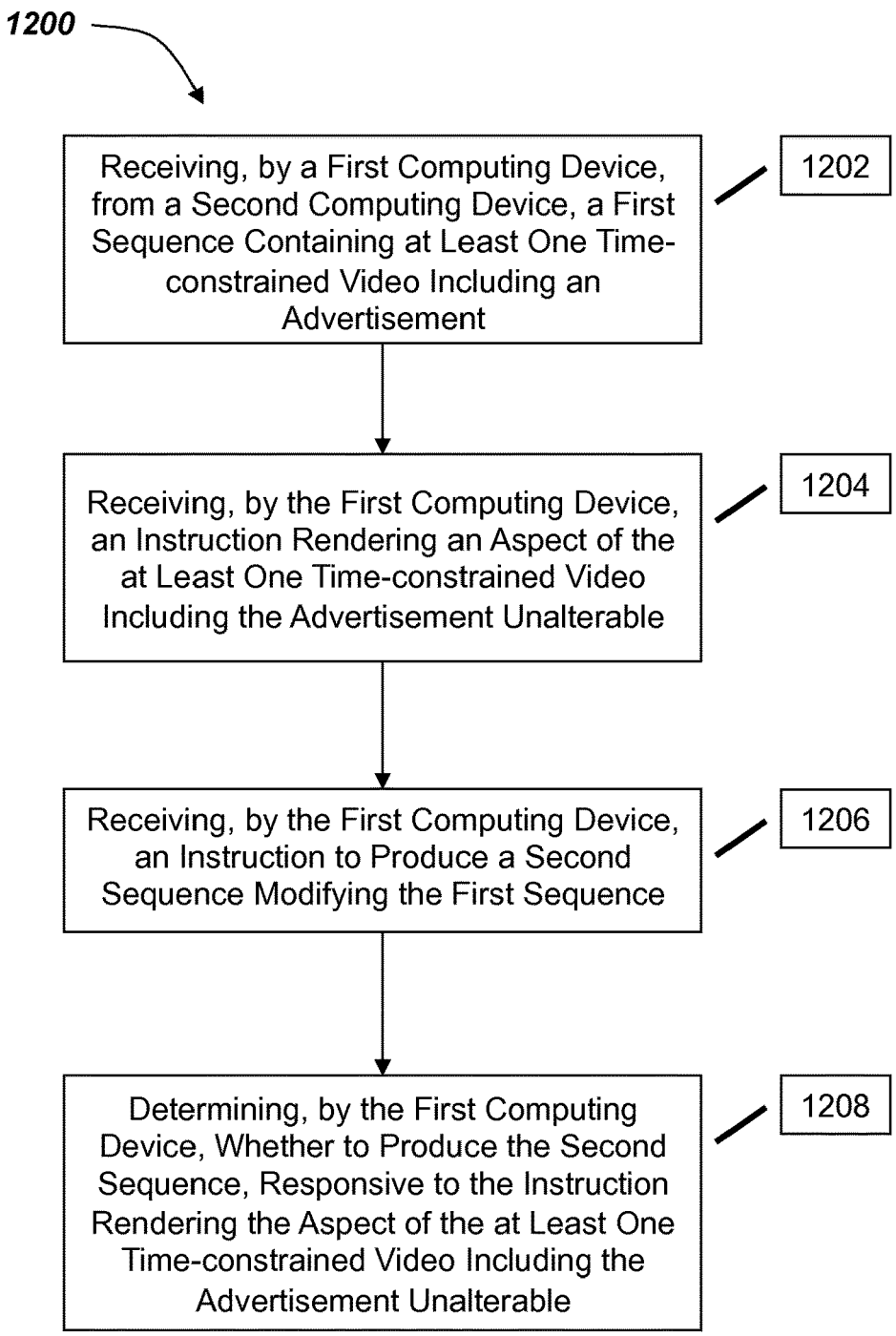
FIG. 12 is a flow diagram depicting an embodiment of a method for modifying a sequence of time-constrained videos having one or more advertisements.

Referring now to FIG. 12, a flow diagram depicts one embodiment of a method 1200 for modifying a sequence of time-constrained videos having one or more advertisements. In brief overview, the method 1200 includes receiving, by a first computing device, from a second computing device, a first sequence containing at least one time-constrained video including an advertisement (1202). The method 1200 includes receiving, by the first computing device, an instruction rendering an aspect of the at least one time-constrained video including the advertisement unalterable (1204). The method 1200 includes receiving, by the first computing device, an instruction to produce a second sequence modifying the first sequence (1206). The method 1200 includes determining, by the first computing device, whether to produce the second sequence, responsive to the instruction rendering the aspect of the at least one time-constrained video including the advertisement unalterable (1208).

Referring now to FIG. 12 in greater detail, and in connection with FIG. 2, the method 1200 includes receiving, by a first computing device, from a second computing device, a first sequence containing at least one time-constrained video including an advertisement (1202). Receiving the first sequence may be implemented as disclosed above in reference to FIGS. 3A and 3E.

The method 1200 includes receiving, by the first computing device, an instruction rendering an aspect of the at least one time-constrained video including the advertisement unalterable (1204). In one embodiment, receiving the instruction is implemented as disclosed above in reference to FIG. 3E.

The method 1200 includes receiving, by the first computing device, an instruction to produce a second sequence modifying the first sequence (1206). Receiving the instruction to produce a second sequence may be implemented as disclosed above in reference to FIGS. 3A and 3E.

The method 1200 includes determining, by the first computing device, whether to produce the second sequence, responsive to the instruction rendering the aspect of the at least one time-constrained video including the advertisement unalterable (1208). In one embodiment, determining may be implemented as disclosed above in reference to FIG. 3E. In some embodiments, determining further involves determining to produce the second sequence. Determining to produce the second sequence may be implemented as described above in reference to FIG. 3E. In other embodiments, determining further includes informing a user generating the instruction to produce a second sequence that the instruction will not be carried out. The user may be informed as disclosed above in reference to FIG. 3E.

Figure 13:
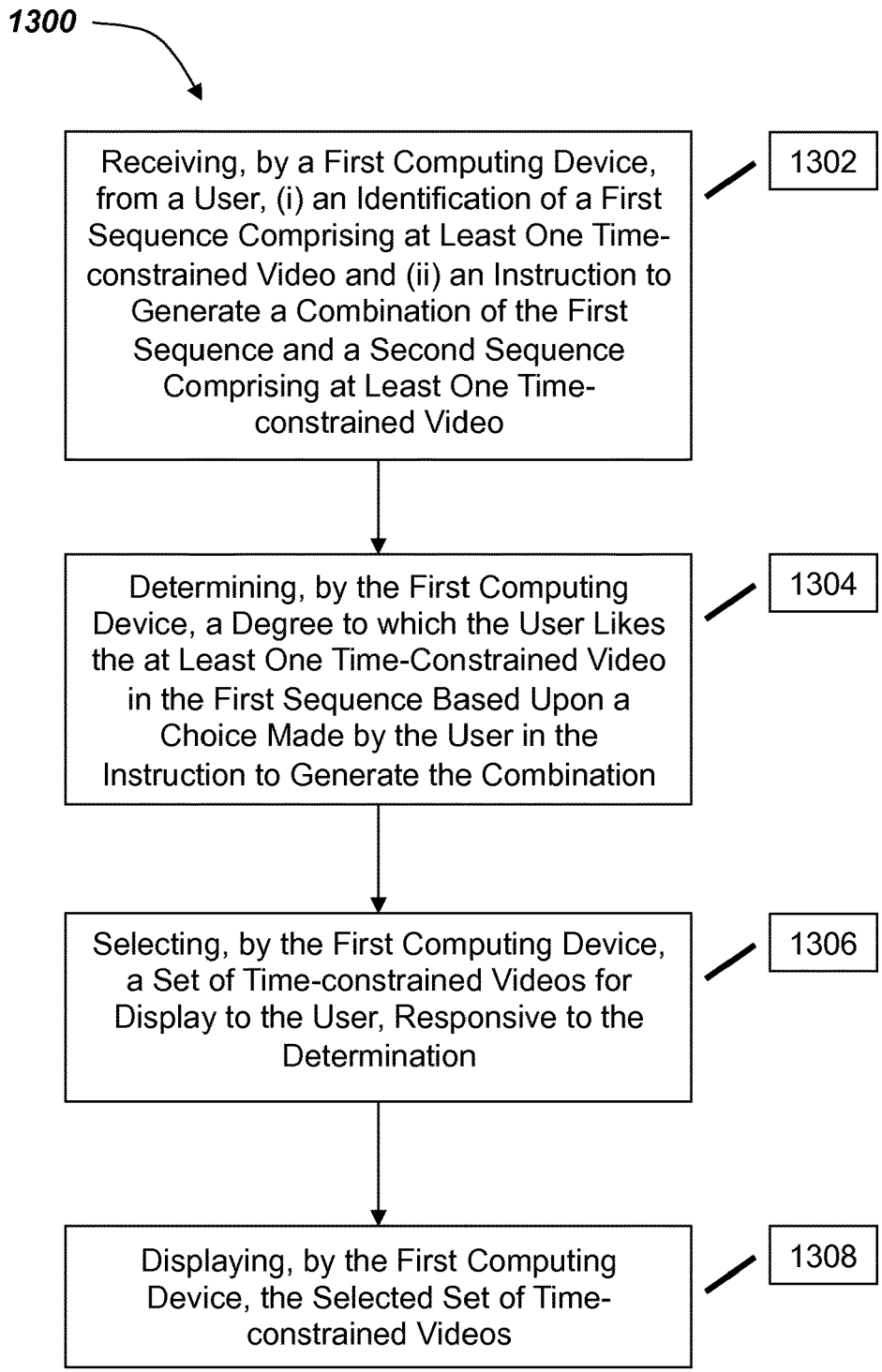
FIG. 13 is a flow diagram depicting an embodiment of a method for recommending time-constrained videos for a user.

Referring now to FIG. 13, a flow diagram depicts one embodiment of a method 1300 for recommending time-constrained videos for a user. In brief overview, the method 1300 includes receiving, by a first computing device, from a user, (i) an identification of a first sequence comprising at least one time-constrained video and (ii) an instruction to generate a combination of the first sequence and a second sequence comprising at least one time-constrained video (1302). The method 1300 includes determining, by the first computing device, a degree to which the user likes the at least one time-constrained video in the first sequence based upon a choice made by the user in the instruction to generate the combination (1304). The method 1300 includes selecting, by the first computing device, a set of time-constrained videos for display to the user, responsive to the determination (1306). The method 1300 includes displaying, by the first computing device, the selected set of time-constrained videos (1308).

Referring now to FIG. 13 in greater detail, and in connection with FIG. 2, the method 1300 includes receiving, by a first computing device, from a user, (i) an identification of a first sequence comprising at least one time-constrained video and (ii) an instruction to generate a combination of the first sequence and a second sequence comprising at least one time-constrained video (1302). In one embodiment, receiving may be implemented as disclosed above in reference to FIG. 3A.

The method 1300 includes determining, by the first computing device, a degree to which the user likes the at least one time-constrained video in the first sequence based upon a choice made by the user in the instruction to generate the combination (1304). In some embodiments, determining is implemented as described above in reference to FIG. 3A.

The method 1300 includes selecting, by the first computing device, a set of time-constrained videos for display to the user, responsive to the determination (1306). Selecting may be implemented as described above in reference to FIG. 3A.

The method 1300 includes displaying, by the first computing device, the selected set of time-constrained videos (1308). In one embodiment, displaying is implemented as disclosed above in reference to FIG. 3A.

The methods and systems disclosed herein bring video manipulation within the reach of users uninterested in learning video editing techniques by presenting them with a system of interchangeable, modular, time-constrained video files. Users can swap and reorder video files in a video sequence to produce entertaining, humorous, and/or educational results. Further variations are available to the user in the form of interchangeable sound files and the ability to write captions to any of the modular videos or sequences thereof. Users can create time-constrained videos of their own as well, and use self-created videos to review products and services.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices. Although certain components described herein are depicted as separate entities, for ease of discussion, it should be understood that this does not restrict the architecture to a particular implementation. For instance, the functionality of some or all of the described components may be encompassed by a single circuit or software function; as another example, the functionality of one or more components may be distributed across multiple components.

Each computer program within the scope of the claims below may be implemented in any programming language, such as assembly language, machine language, a high-level procedural programming language, or an object-oriented programming language. The programming language may, for example, be LISP, PROLOG, PERL, Python, C, C++, C#, JAVA, Ruby, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions described in this document by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks, such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for creating, combining, and sharing time-constrained videos, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method comprising:
   displaying, by a video display device, to a user of a client device, a broadcast of an audiovisual data feed, the video display device and the client device comprising separate devices both associated with the user;
   receiving, by the client device, from the user, an identification of a portion of the audiovisual data feed viewed by the user in the display of the broadcast by the video display device;
   determining, by the client device, that a provider of the broadcast divided the audiovisual data feed of the broadcast into a plurality of segments prior to broadcasting the audiovisual data feed;
   providing, by the client device, the user with access to a first video including the plurality of the provider-divided segments containing content from the audiovisual data feed broadcast to the video display device;
   generating, by the client device, a second and time-constrained video including a subset of the plurality of provider-divided segments, the subset including at least one provider-divided segment associated with the identified portion of the audiovisual data feed broadcast to the video display device;
   receiving, by the client device, from the user, an instruction to combine the second, time-constrained video with a third, time-constrained video on the client device, the third, time-constrained video including content that is (i) generated by the user and (ii) distinct from the provider-divided segments; and
   generating, by the client device, a combination of the second, time-constrained video with the third, time-constrained video,
   wherein the second, time-constrained video and the third, time-constrained video are each of a fixed maximum length.

2. The method of claim 1 further comprising providing, by the client device, the user with an interface for sharing the combination of the second, time-constrained video and the third, time-constrained video.

3. The method of claim 1, wherein displaying further comprises displaying a broadcast of a live event.

4. The method of claim 1, wherein the user is a first user, wherein the client device is a first client device, wherein the method further comprises:

providing, by the client device, to the first user, an interface to view time-constrained videos generated by other users of a plurality of client devices, the respective time-constrained videos generated by the other users from the identified portion of the audiovisual data feed including at least one segment selected by the respective user with the respective client device.

5. The method of claim 4 further comprising:
providing, by the first client device, the first user with an interface for sharing the combination of the second, time-constrained video and the third, time-constrained video with the respective users; and
providing, by the plurality of client devices, to the other users, interfaces for sharing the time-constrained videos generated by the respective users with one another and with the first user, respectively.

6. The method of claim 5, wherein displaying further comprises displaying a live broadcast of an event to the first user and each of the respective users.

7. The method of claim 6 further comprising generating includes generating the combination of the second, time-constrained video and the third, time-constrained video during the live broadcast.

8. The method of claim 7 further comprising sharing the combination of the second, time-constrained video and the third, time-constrained video with the other users, by the first user, during the live broadcast.

9. The method of claim 8 further comprising generating by at least one user included in the other users, by a client device possessed by the at least one user, a time-constrained video including content included in the combination of the second, time-constrained video and the third, time-constrained video shared by the first user during the live broadcast.

10. The method of claim 4 further comprising synchronizing the video display device and the first client device.

11. The method of claim 4 further comprising including sponsored content in at least one segment included in the plurality of segments.

12. The method of claim 11, further comprising providing the sponsored content in an unalterable form.

* * * * *

UNITED STATES PATENT AND TRADEMARK OFFICE
CERTIFICATE OF CORRECTION

PATENT NO. : 10,074,400 B2
APPLICATION NO. : 14/293033
DATED : September 11, 2018
INVENTOR(S) : Bonhomme et al.

Page 1 of 1

It is certified that error appears in the above-identified patent and that said Letters Patent is hereby corrected as shown below:

In the Specification

In Column 6, Line 67, delete ".mp4MPEG-4" and insert -- .mp4 MPEG-4 --, therefor.

Signed and Sealed this
Eighth Day of January, 2019

Andrei Iancu
*Director of the United States Patent and Trademark Office*